US012684618B2

(12) United States Patent (10) Patent No.: US 12,684,618 B2
Harada et al. (45) Date of Patent: Jul. 14, 2026

(54) TERMINAL

(71) Applicant: NTT DOCOMO, INC., Tokyo (JP)

(72) Inventors: Hiroki Harada, Tokyo (JP); Daisuke Kurita, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 359 days.

(21) Appl. No.: 17/630,446

(22) PCT Filed: Jul. 31, 2019

(86) PCT No.: PCT/JP2019/030067
§ 371 (c)(1),
(2) Date: Jan. 26, 2022

(87) PCT Pub. No.: WO2021/019740
PCT Pub. Date: Feb. 4, 2021

(65) Prior Publication Data
US 2022/0256603 A1 Aug. 11, 2022

(51) Int. Cl.
*H04W 74/08* (2024.01)
*H04W 24/08* (2009.01)
*H04W 72/0453* (2023.01)
*H04W 74/0816* (2024.01)

(52) U.S. Cl.
CPC ....... *H04W 74/0816* (2013.01); *H04W 24/08* (2013.01); *H04W 72/0453* (2013.01); *H04W 74/0866* (2013.01)

(58) Field of Classification Search
CPC . H04L 5/0094; H04L 5/0053; H04L 27/0006; H04L 5/001; H04L 5/0051; H04W 72/0453; H04W 24/08; H04W 74/0816; H04W 74/0866; H04W 74/0808
See application file for complete search history.

(56) References Cited

U.S. PATENT DOCUMENTS

| | | | |
|---|---|---|---|
| 2018/0027583 A1 | 1/2018 | Fu et al. | |
| 2019/0052434 A1 | 2/2019 | Zhou et al. | |
| 2019/0150142 A1* | 5/2019 | Huang ................... | H04W 72/23 |
| | | | 370/336 |
| 2020/0154267 A1* | 5/2020 | Soriaga ................. | H04L 1/0026 |
| 2020/0305134 A1* | 9/2020 | Noh ....................... | H04L 5/0053 |
| 2020/0329389 A1* | 10/2020 | Hosseini ............... | H04L 5/0053 |

(Continued)

OTHER PUBLICATIONS

International Search Report issued in PCT/JP2019/030067 on Mar. 17, 2020 (3 pages).

(Continued)

*Primary Examiner* — Andrew Lee
(74) *Attorney, Agent, or Firm* — Osha Bergman Watanabe & Burton LLP

(57) ABSTRACT
A terminal including: a reception unit configured to receive, from a base station apparatus, configuration information of a plurality of search spaces each of which is associated with a control resource set, wherein, between a plurality of control resource sets associated with the plurality of search spaces, values of parameters of a part of a plurality of parameters that each control resource set has are common, and the reception unit monitors a downlink physical control channel using a frequency domain resource designated by all of or a part of the plurality of control resource sets.

4 Claims, 17 Drawing Sheets

(56)                  References Cited

U.S. PATENT DOCUMENTS

| | | | | |
|---|---|---|---|---|
| 2020/0344729 A1* | 10/2020 | Park | .................... | H04L 5/0053 |
| 2020/0389847 A1* | 12/2020 | Deng | ................ | H04W 52/0219 |
| 2021/0028914 A1* | 1/2021 | Jin | ......................... | H04W 8/22 |
| 2021/0068154 A1* | 3/2021 | Jia | ...................... | H04W 74/002 |
| 2022/0015034 A1* | 1/2022 | Miao | ................ | H04W 52/0235 |
| 2022/0022176 A1* | 1/2022 | Chen | ................... | H04W 72/23 |
| 2022/0162198 A1* | 5/2022 | Spencer | .............. | C07D 405/12 |
| 2022/0368468 A1* | 11/2022 | Xiong | .................. | H04W 76/27 |

OTHER PUBLICATIONS

Written Opinion of the International Searching Authority issued in PCT/JP2019/030067 on Mar. 17, 2020 (3 pages).
Nokia, Nokia Shanghai Bell; "On wideband operation in NR-U"; 3GPP TSG RAN WG1 Meeting #97, R1-1906657; Reno, Nevada, USA; May 13-17, 2019 (15 pages).

3GPP TS 38.331 V15.6.0; "3rd Generation Partnership Project; Technical Specification Group Radio Access Network; NR; Radio Resource Control (RRC) protocol specification (Release 15)"; Jun. 2019 (519 pages).
3GPP TS 38.213 V15.6.0; "3rd Generation Partnership Project; Technical Specification Group Radio Access Network; NR; Physical layer procedures for control (Release 15)"; Jun. 2019 (107 pages).
3GPP TS 38.212 V15.6.0; "3rd Generation Partnership Project; Technical Specification Group Radio Access Network; NR; Multiplexing and channel coding (Release 15)"; Jun. 2019 (101 pages).
Office Action issued in the counterpart Japanese Patent Application No. 2021-536555, mailed on Aug. 29, 2023 (5 pages).
Extended European Search Report issued in European Application No. 19940117.5, dated Mar. 27, 2023 (9 pages).

* cited by examiner

```
ControlResourceSet ::=          SEQUENCE { controlResourceSetId             ControlResourceSetId, frequencyDomainResources         BIT STRING (SIZE (45)),
    duration                         INTEGER (1 ..maxCoReSetDuration),
    cce-REG-MappingType              CHOICE {
        interleaved                      SEQUENCE {
            reg-BundleSize                   ENUMERATED {n2, n3, n6},
            interleaverSize                  ENUMERATED {n2, n3, n6},
            shiftIndex                       INTEGER(0..maxNrofPhysicalResourceBlocks-1)    OPTIONAL -- Need S
        },
        nonInterleaved                   NULL,
    },
    precoderGranularity              ENUMERATED {sameAsREG-bundle, allContiguousRBs},
    tci-StatesPDCCH-ToAddList        SEQUENCE(SIZE (1..maxNrofTCI-StatesPDCCH)) OF TCI-StateId OPTIONAL, -- Cond NotSIB1-initialBWP
    tci-StatesPDCCH-ToReleaseList    SEQUENCE(SIZE (1..maxNrofTCI-StatesPDCCH)) OF TCI-StateId OPTIONAL, -- Cond NotSIB1-initialBWP
    tci-PresentInDCI                 ENUMERATED {enabled}                                   OPTIONAL, -- Need S
    pdcch-DMRS-ScramblingID          INTEGER (0 ..65535)                                    OPTIONAL, -- Need S
}
```

FIG.6

```
SearchSpace ::=                        SEQUENCE {
    searchSpaceId                      SearchSpaceId,
    controlResourceSetId               ControlResourceSetId               OPTIONAL,    -- Cond SetupOnly
    monitoringSlotPeriodicityAndOffset CHOICE {

SlotFormatCombinationsPerCell

The IE *SlotFormatCombinationsPerCell* is used to configure the SlotFormatCombinations applicable for one serving cell (see TS 38.213 [13], clause 11.1.1).

SlotFormatCombinationsPerCell information element

```
-- ASN1START
-- TAG-SLOTFORMATCOMBINATIONSPERCELL-START

SlotFormatCombinationsPerCell ::=    SEQUENCE {
    servingCellId                        ServCellIndex,
    subcarrierSpacing                    SubcarrierSpacing,
    subcarrierSpacing2                   SubcarrierSpacing
    slotFormatCombinations               SEQUENCE (SIZE (1..maxNrofSlotFormatCombinationsPerSet)) OF SlotFormatCombination    OPTIONAL,    -- Need R
                                                                                                        OPTIONAL,    -- Need M
    positionInDCI                        INTEGER(0..maxSFI-DCI-PayloadSize-1)                           OPTIONAL,    -- Need M
    ...
}

SlotFormatCombination ::=            SEQUENCE {
    slotFormatCombinationId              SlotFormatCombinationId,
    slotFormats                          SEQUENCE (SIZE (1..maxNrofSlotFormatsPerCombination)) OF INTEGER (0..255)
}

SlotFormatCombinationId ::=          INTEGER (0..maxNrofSlotFormatCombinationsPerSet-1)

-- TAG-SLOTFORMATCOMBINATIONSPERCELL-STOP
-- ASN1STOP
```

TERMINAL

TECHNICAL FIELD

The present invention relates to a terminal in a wireless communication system.

BACKGROUND ART

In NR (New Radio) (also referred to as "5G"), a successor system to the Long Term Evolution (LTE), technologies that satisfy requirements such as high capacity systems, high data transmission rate, low delay, simultaneous connection of multiple terminals, low cost, and power saving are being studied.

In addition, the existing LTE system supports use of frequency bands different from licensed bands licensed to telecom carriers (operators), (i.e., unlicensed bands, unlicensed carriers, and unlicensed CC) in order to expand the frequency bands. Examples of unlicensed bands include a 2.4-GHz band, a 5-GHz band, and a 6-GHz band where Wi-Fi (registered trademark) or Bluetooth (registered trademark) can be used.

Specifically, Rel.13 supports Carrier Aggregation (CA), which integrates a carrier (CC) of a licensed band and a carrier (CC) of an unlicensed band. Like this, communication using the unlicensed band with the license band is called License-Assisted Access (LAA).

In a wireless communication system that communicates using an unlicensed band with a license band, a base station apparatus in downlink performs channel sensing (carrier sensing) to check presence or absence of transmission by other devices (e.g., base station apparatus, user terminal, Wi-Fi device, etc.) before transmission of data in the unlicensed band. As a result of the sensing, when it is confirmed that there is no transmission by other devices, a transmission opportunity can be obtained and transmission can be performed for a predetermined period. This operation is called LBT (Listen Before Talk). The predetermined period is also referred to as a Channel Occupancy Time (COT). Also, in NR, the system that supports the unlicensed band is called an NR-U system.

The NR-U system is assumed to operate in a bandwidth greater than 20 MHz (e.g., 100 MHz) (called wideband operation, or broadband operation).

PRIOR ART DOCUMENTS

Non-Patent Documents

[Non-Patent Document 1] 3GPP TS 38.331 V15.6.0 (2019-06)
[Non-Patent Document 2] 3GPP TS 38.213 V15.6.0 (2019-06)
[Non-Patent Document 3] 3GPP TS 38.212 V15.6.0 (2019-06)

SUMMARY OF INVENTION

Problem to be Solved by the Invention

In wideband operation, it is assumed that the base station apparatus performs LBT at each of multiple subbands (e.g., 20 MHz) that comprise the wide bandwidth.

In this case, there are wideband operation case_1 and wideband operation case_2. In the wideband operation case_1, if the base station apparatus fails in LBT for at least one of the multiple subbands, the base station apparatus determines that LBT has failed in the whole wideband, and if LBT is successful for all the subbands, the base station apparatus performs data transmission by PDSCH using the wideband. In wideband operation case_2, the base station apparatus transmits data by PDSCH using one or more subbands in which LBT have succeeded.

In wideband operation case_2, data may be transmitted in each of the multiple subbands that comprise a wide bandwidth, so the user terminal needs to monitor a PDCCH (downstream physical control channel) with a frequency domain resource of each subband. In the prior art, frequency domain resources for monitoring are configured to the user terminal by a control resource set (called CORESET) described in Non-Patent Document 1.

However, when the conventional CORESET is configured for each of the plurality of subbands, there is a problem that the complexity of the user terminal increases. That is, there is a problem in that, in the prior art, the user terminal may not be able to appropriately monitor the downlink physical control channel in the wideband operation.

The present invention has been developed in view of the foregoing, and is intended to provide a technique for allowing a user terminal to appropriately monitor a downlink physical control channel in a wideband operation.

Means for Solving Problems

According to the disclosed technique, there is provided a terminal including:

a reception unit configured to receive, from a base station apparatus, configuration information of a plurality of search spaces each of which is associated with a control resource set, wherein, between a plurality of control resource sets associated with the plurality of search spaces, values of parameters of a part of a plurality of parameters that each control resource set has are common, and the reception unit monitors a downlink physical control channel using a frequency domain resource designated by all of or a part of the plurality of control resource sets.

Effects of the Invention

According to the disclosed technique, in a wideband operation, a technique is provided which allows the user terminal to monitor a downlink physical control channel appropriately.

BRIEF DESCRIPTION OF DRAWINGS

FIG. 1 is a diagram for explaining a wireless communication system according to an embodiment of the present invention;

FIG. 5 is a diagram showing an example of CORESET configuration information;

FIG. 6 is a diagram showing an example of search space configuration information;

FIG. 8 is a diagram for explaining Example 1-1;

FIG. 10 is a diagram for explaining an example of a method of notifying a COT structure;

MODE FOR CARRYING OUT THE INVENTION

Figure 2:
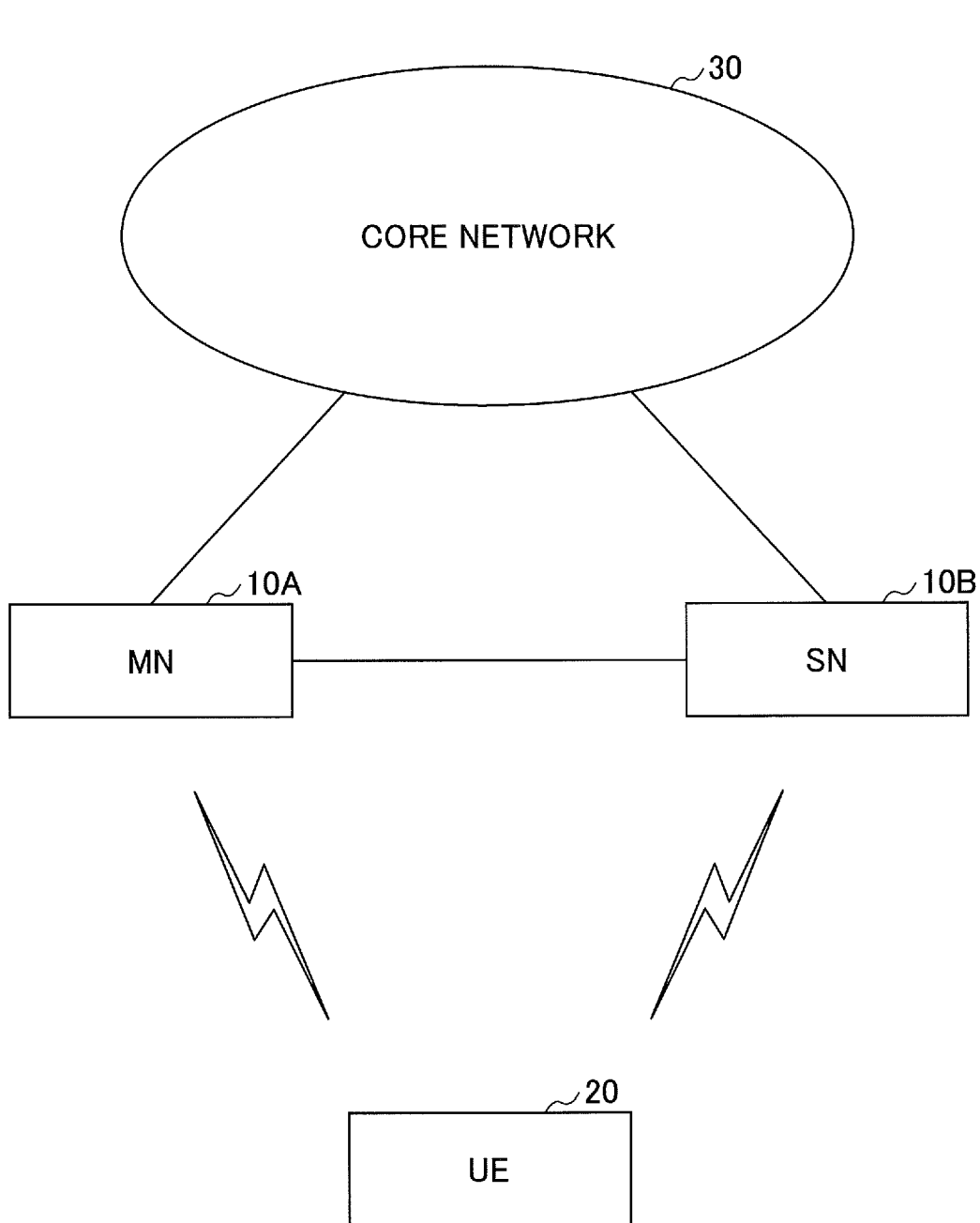
FIG. 2 is a diagram for explaining a wireless communication system according to an embodiment of the present invention.

Hereinafter, embodiments of the present invention will be described with reference to the drawings. The embodiments described below are examples, and the embodiments to which the present invention is applied are not limited to the following embodiments.

In operating a wireless communication system according to an embodiment of the present invention, existing techniques are used as appropriate. The existing technology is, for example, an existing NR. The present invention is applicable not only to NR but also to any wireless communication system.

In embodiments of the present invention, the duplex method to be used may be a TDD (Time Division Duplex) method, a FDD (Frequency Division Duplex) method, or any other method (e.g., Flexible Duplex, etc.).

In an embodiment of the present invention, a wireless parameter or the like being "configured" may mean that a predetermined value is preconfigured or that a wireless parameter notified from the base station apparatus 10 or the user terminal 20 is configured.

(System Configuration)

FIG. 1 is a diagram illustrating a wireless communication system according to an embodiment of the present invention. The wireless communication system in an embodiment of the present invention includes a base station apparatus 10 and a user terminal 20, as shown in FIG. 1. In FIG. 1, one base station apparatus 10 and one user terminal 20 are shown, but this is an example and a plurality of base station apparatuses 10 and a plurality of user terminals 20 may be provided. The user terminal 20 may be referred to as a "terminal." The wireless communication system according to this embodiment may be referred to as a NR-U system.

The base station apparatus 10 is a communication device that provides one or more cells and performs wireless communication with the user terminal 20. The physical resources of the radio signal are defined in the time domain and the frequency domain, the time domain may be defined in slots or OFDM symbols, and the frequency domain may be defined in subbands, subcarriers or resource blocks.

As shown in FIG. 1, the base station apparatus 10 transmits control information or data in DL (Downlink) to the user terminal 20 and receives control information or data in UL (Uplink) from the user terminal 20. Both the base station apparatus 10 and the user terminal 20 are capable of beamforming to transmit and receive signals. Also, both the base station apparatus 10 and the user terminal 20 can apply communication by MIMO (Multiple Input Multiple Output) to DL or UL. The base station apparatus 10 and the user terminal 20 may both communicate via a CA (Carrier Aggregation) via an SCell (Secondary Cell) and a PCell (Primary Cell).

The user terminal 20 is a communication device having a wireless communication function such as a smartphone, a cellular phone, a tablet, a wearable terminal, a communication module for M2M (Machine-to-Machine), or the like. As shown in FIG. 1, the user terminal 20 utilizes various communication services provided by the wireless communication system by receiving control information or data in DL from the base station apparatus 10 and transmitting control information or data in UL to the base station apparatus 10.

FIG. 2 shows an example of a configuration of a wireless communication system when NR-DC (NR-Dual connectivity) is executed. As shown in FIG. 2, a base station apparatus 10A serving as an MN (Master Node) and a base station apparatus 10B serving as an SN (Secondary Node) are provided. The base station apparatus 10A and the base station apparatus 10B are each connected to a core network. The user terminal 20 communicates with both the base station apparatus 10A and the base station apparatus 10B.

A cell group provided by the base station apparatus 10A that is an MN is called an MCG (Master Cell Group), and a cell group provided by the base station apparatus 10B that is an SN is called an SCG (Secondary Cell Group). The operations described later in Examples 1 to 8 may be performed in any of the configurations of FIGS. 1 and 2.

In the wireless communication system according to the present embodiment, the LBT described before is executed. When an LBT result is idle (when the LBT is successful), the base station apparatus 10 or the user terminal 20 acquires a COT and performs transmission, and when the LBT result is busy, transmission is not performed.

The wireless communication system according to this embodiment may perform a carrier aggregation (CA) operation using an unlicensed CC and a licensed CC, a dual connectivity (DC) operation using an unlicensed CC and a licensed CC, or a stand-alone (SA) operation using an unlicensed CC alone. CA, DC, or SA may be performed by any one system of NR and LTE. DC may be performed by at least two of NR, LTE, and other systems.

The user terminal 20 may assume existence of a signal (for example, a reference signal (RS) such as Demodulation Reference Signal (DMRS)) in a PDCCH or a group common PDCCH (group common (GC)-PDCCH) to detect a transmission burst from the base station apparatus 10.

The base station apparatus 10 may transmit a specific PDCCH (PDCCH or GC-PDCCH) containing a specific DMRS notifying of start of a COT at the start of the COT initiated by the base station apparatus. At least one of a specific PDCCH and a specific DMRS may be referred to as a COT start notification signal. For example, the base station apparatus 10 transmits a COT start notification signal to one or more user terminals, and the user terminal can recognize the COT when a specific DMRS is detected.

(About Wideband Operations)

In the wireless communication system according to this embodiment, in DL, wideband operation (also referred to as broadband operation) is performed by a carrier having a bandwidth greater than 20 MHz.

In wideband operation, multiple BWPs (Bandwidth parts) can be configured in one carrier. One of the configured BWPs is activated. The base station apparatus 10 transmits data by a PDSCH when LBT (also referred to as CCA) is successful in all or one or more bands of the active BWP.

In this embodiment, the wideband operation case_1 and the wideband operation case_2 are used as the wideband operation.

In the wideband operation case_1, the base station apparatus 10 transmits data by a PDSCH using the whole band of BWP if LBT in all LBT bands (which may be referred to as subbands) in the active BWP is successful.

Figure 3:
FIG. 3 is a diagram for explaining Wideband operation case_1.

FIG. 3 shows an example of wideband operation case_1. In the example of FIG. 3, a 100 MHz active BWP consists of five LBT bands (20 MHz bandwidth for each LBT band). The base station apparatus 10 executes LBT, and when LBT succeeds in all the five LBT bands, the base station apparatus 10 performs data transmission by a PDSCH using the whole band. On the other hand, as shown in the lower part of FIG. 3, when there is at least one LBT band in which LBT is NG, it is regarded that LBT fails in the whole band, and data transmission by PDSCH is not performed.

In the wideband operation case_2, the base station apparatus 10 transmits data using an LBT band in which LBT succeeds in the active BWP.

Figure 4:
FIG. 4 is a diagram for explaining Wideband operation case_2.

FIG. 4 shows an example of wideband operation case_2. In the example of FIG. 4, out of the five LBT bands, data transmission by a PDSCH is performed using the three LBT-successful bands.

(CORESET, Search Space)

The user terminal 20 monitors a PDCCH to receive data transmitted by a PDSCH. The user terminal 20 is configured with a CORESET (Control Resource Set) and a search space associated with the CORESET by RRC, and the user terminal 20 monitors the PDCCH by monitoring a time and frequency range at a time position based on the configuration. In summary, CORESET is a box of frequency×time for performing monitoring, and the search space specifies cycle, offset in time domain, etc. of the associated CORESET.

FIG. 5 is an extract from Non-Patent Document 1 showing an example of an RRC message for configuring a CORESET. FIG. 6 is an extract from Non-Patent Document 1 showing an example of an RRC message for configuring a search space.

(About Problem)

When the operation of the wideband operation case_2 is assumed, the user terminal 20 may receive PDCCH per LBT band, so that CORESET may have a bandwidth limited to a bandwidth of the LBT band (e.g., the same bandwidth as the LBT bandwidth), and at present, the number of CORESETs per BWP is up to 3, but for example, in order to support the example shown in FIG. 4, it can be considered to increase the number of CORESET per BWP to up to 5.

However, simply increasing the number of CORESETs per BWP can cause the following problems.

Simply increasing the number of CORESETs can unnecessarily increase complexity of the user terminal 20 when each CORESET has its own parameter values (e.g., TCI state value, time length, etc.), as in the existing technique shown in FIG. 5.

Also, if the number of CORESETs that can be associated with one search space ID is 1, as in the existing technology, the search space configuration will be unnecessarily increased.

In addition, considering wideband operation case_1, it is preferable to configure one CORESET over multiple LBT bands. However, if the user terminal 20 cannot understand which of the wideband operation case_1 and the wideband operation case_2 is executed by the base station apparatus 20, it is unclear whether or not the user terminal 20 uses a single CORESET spanning a plurality of LBT bands, and the user terminal 20 cannot perform proper operation.

Hereinafter, an operation example in a wireless communication system for appropriately supporting a wide band operation will be described in detail with reference to Examples 1 to 6. Any of the embodiments of Examples 1-6 may be combined unless there is a conflict.

Example 1

First, Example 1 will be described. Example 1 includes Examples 1-1 and 1-2.

Example 1-1

In Example 1-1, the rules of CORESET and Search Space in the existing technology Rel-15 are basically used. However, there is limitation for configurations among multiple CORESETs. More specific explanation is as follows.

Similar to Rel-15, the user terminal 20 is configured with one CORESET for one search space. The number of search spaces that can be configured per BWP in the user terminal 20 is 10 in the Rel-15, but in Example 1-1 (e.g., Re-16 NR UE), more than 10 search spaces may be configured.

Further, depending on the capability of the user terminal 20 (UE capability), at least the TCI state and the time length are set to be the same value between the plurality of CORESETs, and the plurality of CORESETs are configured from the base station apparatus 10 to the user terminal 20. That is, among the plurality of CORESETs associated with the plurality of search spaces, values of a part of parameters of the plurality of parameters of each CORESET are common.

For example, the user terminal 20 reports the maximum number of CORESETs (the maximum number per BWP) that may have different values of parameters such as the TCI state and the time length to the base station apparatus 10 as its own capability (UE capability), and the base station apparatus 10 configures CORESET to the user terminal 20 based on the report.

For example, the user terminal 20 may report the maximum number of CORESETs (the maximum number per BWP) in which values of parameters such as the TCI state and the time length are not different (that is, the values of parameters are the same) to the base station apparatus 10 as the UE capability, and the base station apparatus 10 may configure CORESET to the user terminal 20 based on the report.

For example, when the user terminal 20 reports to the base station apparatus 20 that the number of CORESETs in which both the TCI state and the time length may be different between CORESETs is 0 (or 1), the base station apparatus 20 configures a plurality of CORESETs in which the time length and the TCI state are the same and frequency domain resources are different to the user terminal 20.

The user terminal 20 may not assume that the TCI state and the time length are different between a plurality of CORESETs having different frequency domain resources each other. In other words, the user terminal 20 may assume that, when a plurality of CORESETs having different frequency domain resources are configured from the base station apparatus 10, the TCI state and the time length are the same between the plurality of CORESETs.

In Example 1-1, the maximum number of CORESETs configured per 1 BWP is 5. However, "5" is an example and may be a greater number than "5" or a smaller number than "5".

Further, in Example 1-1, based on a COT structure indication transmitted from the base station apparatus 10 to the user terminal 20, the user terminal 20 activates or deactivates a search space. The COT structure indication is information included in a DCI transmitted by, for example, a PDCCH or a GC-PDCCH, and indicates whether a slot (or the timing of monitoring) is in a COT acquired by the base station apparatus 20 or outside the COT. The COT structure indication may indicate an LBT band in which LBT succeeds.

Whether a search space is for inside a COT (activated within a COT) or for outside a COT (activated outside a COT) may be indicated explicitly or implicitly.

Explicit indication means, for example, that search space configuration information includes relation information with a COT (Inside or Outside), and the user terminal 20 determines whether the search space is for inside a COT (activated within the COT) or for outside a COT (activated outside the COT) based on the information.

Implicit notification means, for example, to determine a search space configured with a value of a short monitoring period as a search space for outside a COT, and to determine a search space configured with a value of a long monitoring period (compared to the search space for outside a COT) as a search space for inside a COT.

Figure 7:
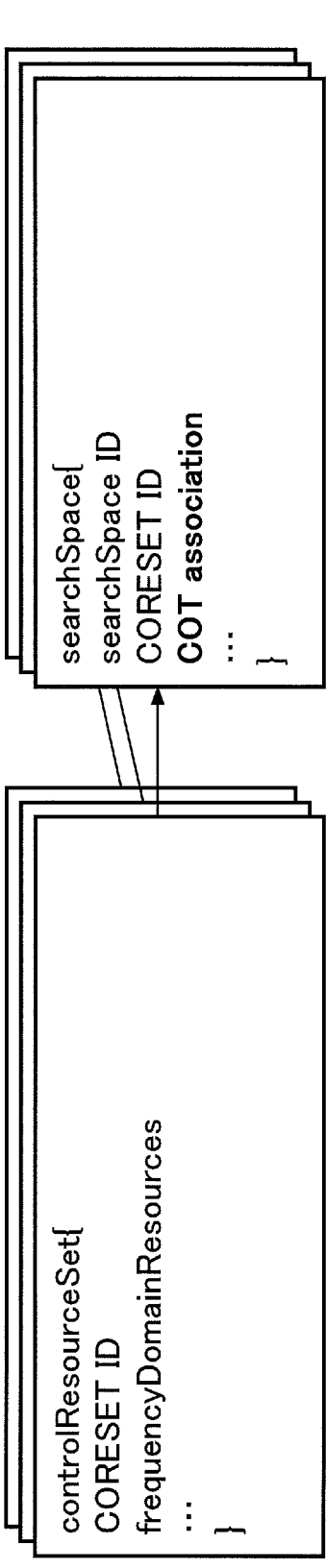
FIG. 7 is a diagram for explaining Example 1-1.

FIG. 7 shows an example of configuration information of a CORESET and configuration information of a search space configured from the base station apparatus 10 to the user terminal 20 in Example 1-1. The configuration information of the CORESET itself is disclosed in Non-Patent Document 1. However, as mentioned above, values of TCI state, time length, etc. are restricted. The configuration information of the search space shown in FIG. 7 differs from that disclosed in Non-Patent Document 1 only in that COT association is added. As described above, for implicit indication, COT association may not be required.

As shown in FIG. 7, one CORESET ID is associated with one search space ID.

FIG. 8 is a diagram for explaining an operation example of the user terminal 20 according to the Example 1-1. In the example of FIG. 8, the operation of wideband operation case_2 is performed, and a band of an active BWP (e.g., 100 MHz) consists of five LBT bands (e.g., 20 MHz).

In the example of FIG. 8, for example, the user terminal 20 is configured with search spaces #W1, #W2, #W3, #W4, and #W5 as search spaces for use outside a COT. The CORESET IDs #X1, #X2, #X3, #X4, and #X5 are associated with the search spaces respectively. For example, the user terminal 20 monitors the frequency and time domain designated by a CORESET of the CORESET ID #X1 at the time position (the period and the offset) designated by the search space #W1.

The frequency domain resource of CORESET ID #X1 indicates, for example, an LBT band shown as 1 in FIG. 8, and the frequency domain resource of CORESET ID #X2 indicates an LBT band shown as 2 in FIG. 8. The same applies to #X3, #X4, and #X5.

In the example of FIG. 8, the user terminal 20 is configured with search spaces #Y1, #Y2, #Y3, #Y4, and #Y5 as search spaces for inside of a COT. The CORESET IDs #X1, #X2, #X3, #X4, and #X5 are associated with each search space. For example, the user terminal 20 monitors the frequency and time domain designated by a CORESET of the CORESET ID #X1 at the time position (the period and the offset) designated by the search space #Y1.

In the example of FIG. 8, in the monitoring opportunity represented by A, B, G, and H, since the user terminal 20 understands that the corresponding slot is outside the COT, the user terminal 20 performs monitoring the PDCCH by the search spaces #W1 to #W5. When the user terminal 20 detects that a slot is inside the COT and LBT bands in which LBT succeeds are 1-4, the user terminal 20 activates the search spaces #Y1-#Y4 (by deactivating the search spaces #W1 through #W5 and #Y5) and monitors the LBT bands 1-4 at the monitoring opportunities indicated by C, D, E, F.

<COT Structure Indication>

Figure 9:
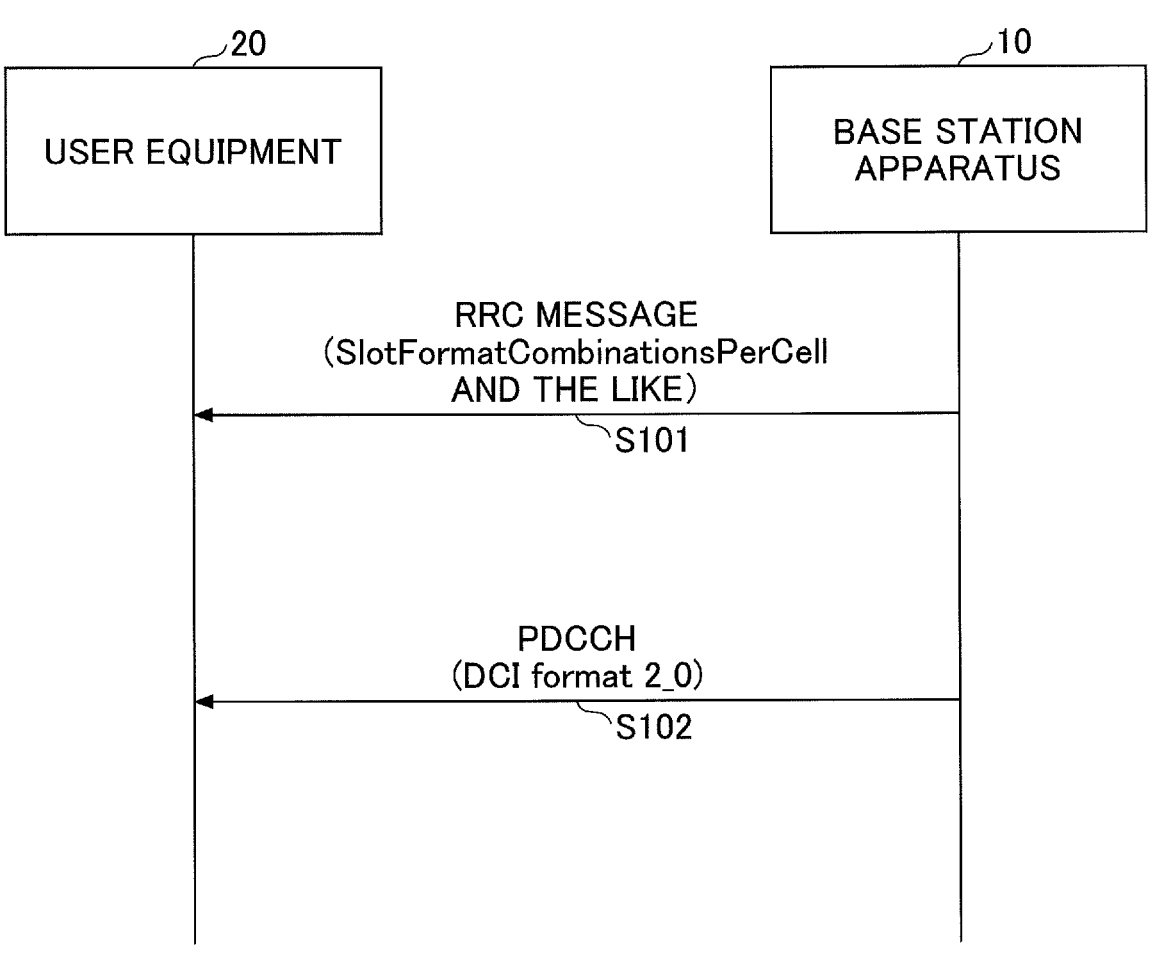
FIG. 9 is a diagram for explaining an example of a method of notifying a COT structure.

Hereinafter, examples of a COT structure indication method common to Examples 1-6 (the present embodiment) will be described. However, the COT structure indication methods described below are examples and other methods may be used. FIG. 9 is a diagram illustrating a basic operation in a COT structure indication method.

In S101, the base station apparatus 10 transmits an RRC message to the user terminal 20 and the user terminal 20 receives the RRC message. This RRC message contains SlotFormatCombinationsPerCell information element for each serving cell. In S101, the base station apparatus 10 may notify the user terminal 20 of an RNTI value (called SFI-RNTI) for monitoring DCI format 2_0.

FIG. 10 shows SlotFormatCombinationsPerCell described in Non-Patent Document 1. In this embodiment, SlotFormatCombinationsPerCell described in Non-Patent Document 1 may be used, or SlotFormatCombinationsPerCell modified from SlotFormatCombinationsPerCell described in Non-Patent Document 1 may be used.

One SlotFormatCombinationsPerCell contains one or more SlotFormatCombinations and a bit position (positInDCI) in DCI Format 2_0 of the SlotFormatCombinationID for a serving cell configured in the user terminal 20.

One SlotFormatCombination Contains

SlotFormatCombinationID and slotFormats. SlotFormats is information in which format numbers (any number from 0 to 255) described in Table 11.1.1-1 of Non-Patent Document 2 are arranged for the number of slots. The format number may also be referred to as a format index. The number of slots may be a value corresponding to a period in which the user terminal 20 monitors DCI format 2_0.

In this embodiment, Table 11.1.1-1 in Non-Patent Document 2 may be used as it is or a modified table may be used.

In S101, the user terminal 20 receives SlotFormatCombinationsPerCell for each serving cell and acquires correspondence information of SlotFormatCombinationID and slotFormats for each serving cell. The acquired correspondence information is stored in a storage device, such as a memory, of the user terminal 20.

In S102 of FIG. 9, the base station apparatus 10 transmits a DCI format 2_0 to the user terminal 20 by a PDCCH (which may be a GC-PDCCH), and the user terminal 20 receives a DCI format 2_0.

The DCI Format 2_0 described in Non-Patent Document 2 and Non-Patent Document 3 may be used as the DCI Format 2_0 in this embodiment, or a DCI Format 2_0 modified from the DCI Format 2_0 described in Non-Patent Document 2 and Non-Patent Document 3 may be used.

The DCI Format 2_0 stores, for each serving cell, SlotFormatCombinationID (also called SFI-index) corresponding to the serving cell in a bit position notified by the RRC message.

The user terminal 20 reads slotFormatCombinationID at a bit position corresponding to a serving cell to grasp slot- Formats in the serving cell. In the following description, if no reference is made to a serving cell, it may be assumed that it is an operation in a serving cell.

For example, suppose that the user terminal 20 receives a DCI format 2_0 at the head portion of slot 1 and reads SlotFormatCombinationID=2. If the user terminal 20 recognizes that SlotFormatCombinationID=2 is {0, 1, 0, 1} based on configuration by RRC, the user terminal 20 can recognize that the format of slot 1 is format 0, the format of slot 2 is format 1, the format of slot 3 is format 0, and the format of slot 4 is format 1.

According to the present embodiment, when the DCI format 2_0 is used, the base station apparatus 10 notifies the user terminal 20 whether or not a slot is within a COT.

Figure 11:
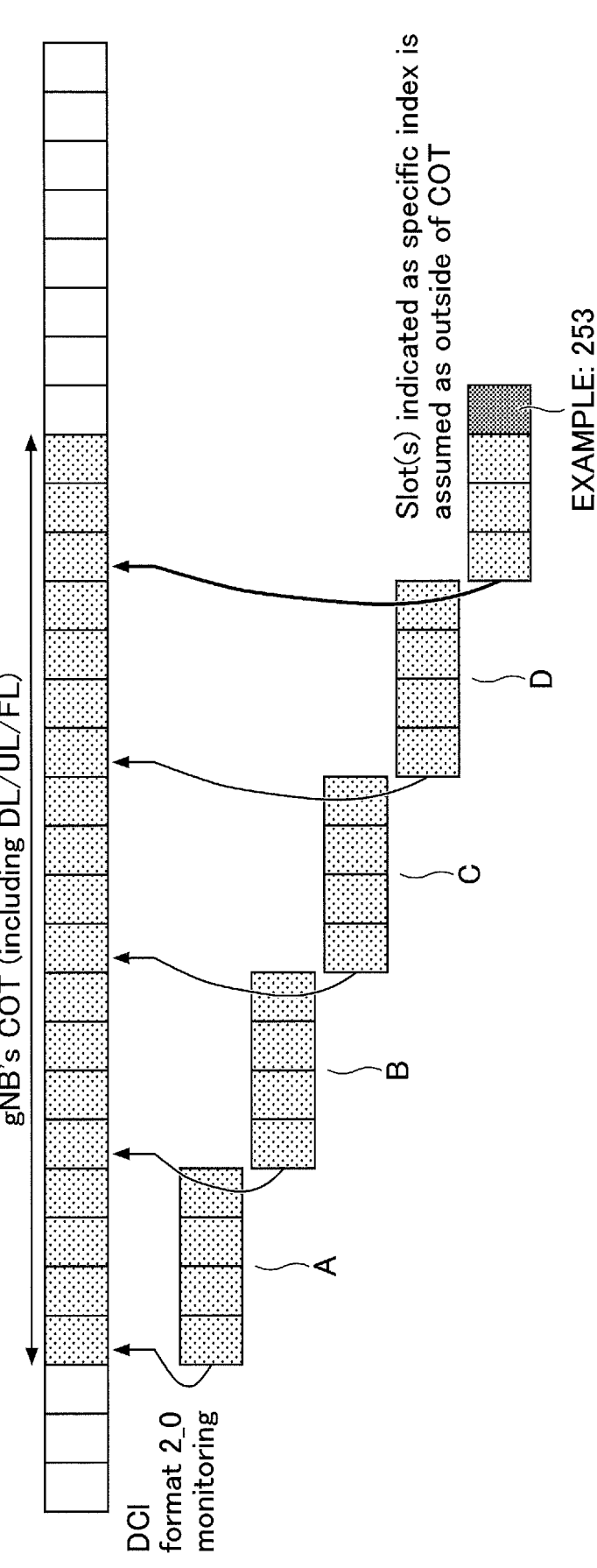
FIG. 11 is a diagram for explaining an example of a method of notifying a COT structure.

An example is shown in FIG. 11. This example is an example of notifying that a slot is out of a COT by using a specific format number. Here, 253 is used as the specific format number. The same operation applies to other specific format numbers.

In S101 of FIG. 9, slotFormatCombinations including slotFormats having the format number=253 (where slotFormatCombinationID=2) is configured to the user terminal 20.

In S102 of FIG. 9, for example, the user terminal 20 receives four times of DCI Format 2_0 (which specifies other than slotFormatCombinationID=2) represented by A to D in FIG. 11, and then receives DCI Format 2_0, which specifies slotFormatCombinationID=2.

The slotFormats of slotFormatCombinationID=2 is, for example, {0, 0, 0, 253}. Accordingly, the user terminal 20 determines that the last of the four slots is outside a COT. The user terminal 20 determines that slots of format numbers other than the specified format number are inside the COT in the slotFormats specified by the DCI format 2_0.

In this embodiment, subband (LBT band) information is included in DCI format 2_0.

The information of the subband includes, for example, information indicating frequency domain resources of each of one or more subbands and IDs corresponding to each subband. For example, in the base station apparatus 10, when LBT of a subband is OK and a COT of the subband is acquired, the base station apparatus 10 transmits to the user terminal 20 a DCI format 2_0 including an ID representing the subband. Thus, the user terminal 20 can determine whether or not a slot is inside a COT in units of subbands (in units of LBT bands).

Example 1-2

Next, Example 1-2 will be described. In Example 1-2, multiple CORESETs can be associated with one search space.

Also, similarly to the Example 1-1, depending on the capability of the user terminal 20 (UE capability), at least the TCI state and the time length are set to be the same value among a plurality of CORESETs associated with the same search space, and the plurality of CORESETs are configured to the user terminal 20 from the base station apparatus 10.

For example, the user terminal 20 reports the maximum number of CORESETs (the maximum number per BWP or per search space) in which values of parameters such as TCI state and time length may be different to the base station apparatus 10 as a UE capability, and the base station apparatus 10 configures CORESETs to the user terminal 20 based on the report.

Also, for example, the user terminal 20 may report the maximum number of CORESETs (the maximum number per BWP or per search space) in which values of parameters such as the TCI state and the time length are not different (that is, the values of parameters are the same) to the base station apparatus 10 as a UE capability, and the base station apparatus 10 may configure CORESETs to the user terminal 20 based on the report.

For example, when the user terminal 20 reports to the base station apparatus 20 that the number of CORESETs, in which the TCI state and the time length may be different among CORESETs, is 0 (or 1), the base station apparatus 20 configures the user terminal 20 with a plurality of CORESETs in which the TCI state and the time length are the same but frequency domain resources are different among the CORESETs.

The user terminal 20 may also not assume that the TCI state and the time length differ among multiple CORESETs having different frequency domain resources each other in the same search space. In other words, when a plurality of CORESETs having different frequency domain resources in the same search space are configured from the base station apparatus 10, the user terminal 20 may assume that the TCI state and the time length are the same among the plurality of CORESETs.

Also in Example 1-2, the maximum number of CORESETs that can be configured per 1 BWP is 5. The maximum number of CORESETs that can be configured per 1 search space is 5. In both cases, however, 5 is an example and it may be a greater number than 5 or a smaller number than 5.

Similar to the Example 1-1, the user terminal 20 activates or deactivates a search space based on a COT structure indication transmitted from the base station apparatus 10 to the user terminal 20.

Figure 12:
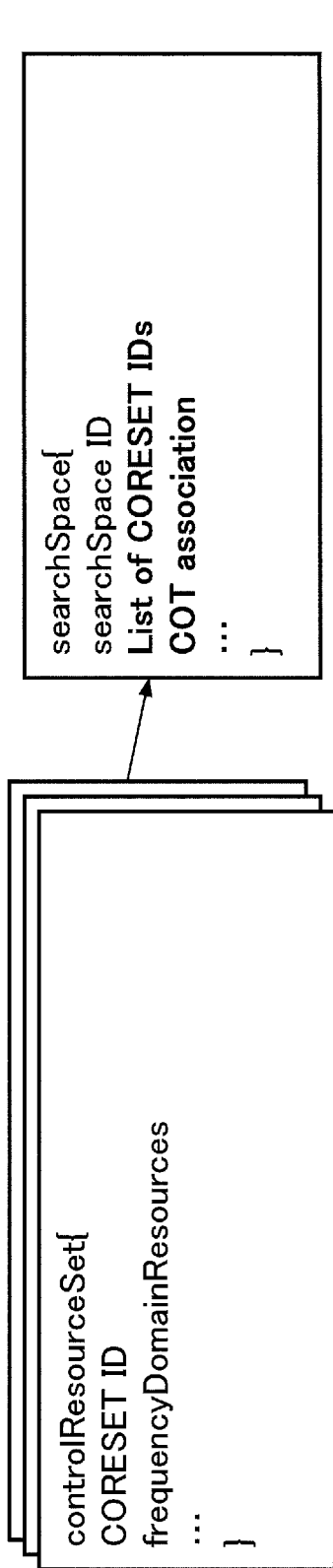
FIG. 12 is a diagram for explaining Example 1-2.

FIG. 12 shows an example of configuration information of a CORESET and configuration information of a search space configured from the base station apparatus 10 to the user terminal 20. The configuration information of the CORESET itself may be one disclosed in Non-Patent Document 1. However, as mentioned above, the TCI state and time length values are restricted.

The search space configuration information shown in FIG. 12 differs from that disclosed in Non-Patent Document 1 in that multiple CORESETs can be configured as a list of CORESET IDs and COT association is added.

As shown in FIG. 12, multiple CORESET IDs are associated with one search space ID.

The operation example of the user terminal 20 according to the Example 1-2 is basically the same as the operation example described in FIG. 8.

However, in the Example 1-2, for example, one search space #W is configured to the user terminal 20 as a search space for outside of a COT, and CORESET IDs #X1, #X2, #X3, #X4, and #X5 described in the Example 1-1 are associated with the search space W. For example, the user terminal 20 monitors a frequency and time region specified by CORESETs of CORESET IDs #X1 to X5 at the time position (period, offset) specified by the search space W.

Also, the search space #Y is configured to the user terminal 20 as a search space for inside of a COT, and CORESET IDs #X1, #X2, #X3, #X4, and #X5 are associated with the search space #Y. For example, when the user terminal 20 detects that, in the base station apparatus 10, LBT has been successfully completed in frequency domain resources corresponding to CORESET IDs #X1 to #X4, the user terminal 20 activates the search space #Y, and at the same time, activates the CORESETs #X1 to #X4, and deactivates the CORESET #X5 to monitor a PDCCH at the frequency and time region designated by a CORESET of each of the CORESET IDs #X1 to #X4 that succeeded in LBT in the base station apparatus 10 at the time position (period, offset) designated by the search space #Y.

In the example of FIG. 8, in the Example 1-2, since the user terminal 20 understands that a corresponding slot is outside a COT in the monitoring opportunities represented by A, B, G, and H, the user terminal 20 monitors a PDCCH in the search space W. When the user terminal detects that monitor timing is inside a COT and LBT bands in which LBT succeeds are 1-4, the user terminal 20 activates the search space #Y (by deactivating the search space #W), activates CORESETs #X1 through #X4, deactivates CORE-SET #X5, and monitors LBT bands of 1-4 at the monitoring opportunities shown by C, D, E, F.

In the Example 1-2, the number of configured search spaces can be reduced compared to that in Example 1-1.

Example 2

Next, Example 2 will be described. In Example 2, a CORESET group consisting of a plurality of CORESETs is used.

In the Example 2, at least the TCI state and the time length are set to be the same value among the plurality of CORE-SETs belonging to the same group, and the CORESET group having the plurality of CORESETs is configured from the base station apparatus 10 to the user terminal 20.

The user terminal 20 may not assume that the TCI state and the time length are not different among multiple CORE-SETs in the same group. In other words, when a plurality of CORESETs in the same group are configured from the base station apparatus 10, the user terminal 20 may assume that the TCI state and the time length are the same among the plurality of CORESETs.

The user terminal 20 may notify the base station apparatus 10 of capability information representing the maximum number of CORESET groups configurable in the user terminal 20. The user terminal 20 may notify the base station apparatus 10 of capability information representing the maximum configurable number of CORESETs per a CORE-SET group. The user terminal 20 may notify the base station apparatus 10 of capability information indicating the maximum number of configurable CORESET groups and the maximum number of configurable CORESETs per CORE-SET group.

In the Example 2, a search space IE (information element) transmitted from the base station apparatus 10 to the user terminal 20 includes an associated CORESET group ID instead of the CORESET ID, unlike the search space IE of Non-Patent Document 1. However, a CORESET ID belonging to the CORESET group associated with the search space may be included in the search space IE instead of the CORESET group ID or with the CORESET group ID.

In Example 2, the maximum number of CORESET groups per BWP is, for example, 3. The maximum number of CORESETs per CORESET group is, for example, 5. Also, the maximum number of search spaces per BWP may be 10 or greater than 10.

Similar to the Example 1-1, the user terminal 20 activates or deactivates a search space based on a COT structure indication transmitted from the base station apparatus 10 to the user terminal 20.

Figure 13:
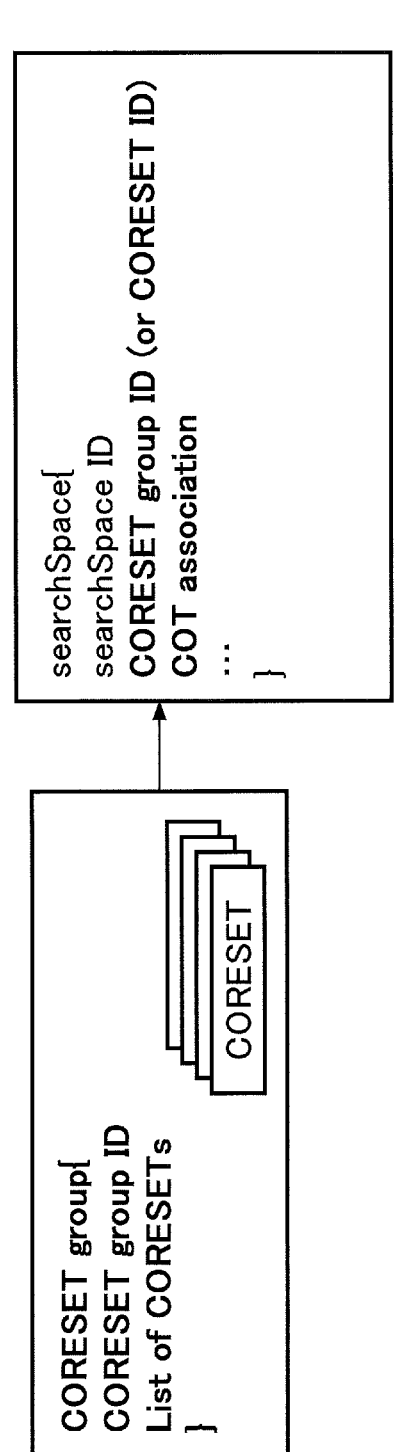
FIG. 13 is a diagram for explaining Example 2.

FIG. 13 shows an example of configuration information of a CORESET group and configuration information of a search space configured from the base station apparatus 10 to the user terminal 20 in the Example 2.

The CORESET group configuration information is a new configuration information that does not exist in the existing technologies. However, the configuration information disclosed in Non-Patent Document 1 can be used for configuration of an individual CORESET that constitutes a CORE-SET group.

The configuration information of the search space shown in FIG. 13 differs from that disclosed in Non-Patent Document 1 in that the CORESET group ID and the COT association are added.

As shown in FIG. 13, one search space ID is associated with a CORESET group consisting of a plurality of CORE-SETs.

The operation example of the user terminal 20 of the Example 2 is basically the same as the operation example described in FIG. 8.

However, in the Example 2, for example, one search space #W is configured to the user terminal 20 as a search space for outside of a COT, and a CORESET group consisting of five CORSETs of CORESET IDs #X1, #X2, #X3, #X4, and #X5 described in the Example 1-1 is associated with the search space W. For example, the user terminal 20 monitors the frequency and time region specified by the CORESETs of CORESET IDs #X1 to X5 at the time position (period, offset) specified by the search space W.

The search space #Y is configured to the user terminal 20 as a search space for inside of a COT, and a CORESET group consisting of five CORESETs of CORESET IDs #X1, #X2, #X3, #X4, and #X5 is associated with the search space #Y. For example, the user terminal 20 monitors the frequency and time region designated by each CORSET of CORESET IDs #X1 to #X4 in which LBT succeeds in the base station apparatus 10 at the time position (the period and the offset) designated by the search space #Y.

In the example of FIG. 8, in the Example 2, in the monitoring opportunities represented by A, B, G, and H, the user terminal 20 understands that the corresponding slot is outside of a COT, and thus the user terminal 20 performs monitoring of a PDCCH in the search space #W. When the user terminal 20 detects that a slot is in the COT and LBT bands in which LBT succeeds are 1-4, the user terminal 20 activates the search space #Y (by deactivating the search space #W) and monitors the LBT bands of 1-4 in the monitoring opportunities indicated by C, D, E, F. Also in Example 2, the configuring number of search spaces can be reduced compared to Example 1-1.

Example 3

Next, Example 3 will be described. In Example 3, sub-CORESET (sub-CORESET) is configured in a CORESET.

Configuration information of contents of each sub-CORESET may be the same as the configuration information of contents of the CORESET in Non-Patent Document 1, or may be a part of the contents of the CORESET in Non-Patent Document 1 (for example, only configuration information of frequency domain resource). If the configuration information for each sub-CORESET is only the configuration information for the frequency domain resource, the other parameters in each sub-CORESET (such as the time length) are configured as configuration information for a CORESET to which the sub-CORESET belongs.

In Example 3, parameters of frequency domain resources are different and the other parameters (TCI state, time length, etc.) are the same among the multiple sub-CORE-SETs in a CORESET. CCE-to-REG mapping of a PDCCH is performed for each sub-CORESET. Note that CCE stands for Control Channel Element and REG stands for Resource Element Group.

In the Example 3, the search space IE (the information element) transmitted from the base station apparatus 10 to the user terminal 20 includes an associated CORESET ID in the same manner as the search space IE of Non-Patent Document 1. In the Example 3, the user terminal 20 can transmit capability information representing the maximum number of sub-CORESETs per CORESET supported by the user terminal 20 to the base station apparatus 10.

The maximum number of sub-CORESETs per CORESET (maximum list size of frequency domain resources) is, for example, 5. The maximum number of CORESETs per BWP is, for example, 3. The maximum number of search spaces per BWP may be 10 or greater than 10.

Similar to the Example 1-1, the user terminal 20 activates or deactivates a search space based on a COT structure indication transmitted from the base station apparatus 10 to the user terminal 20.

Figure 14:
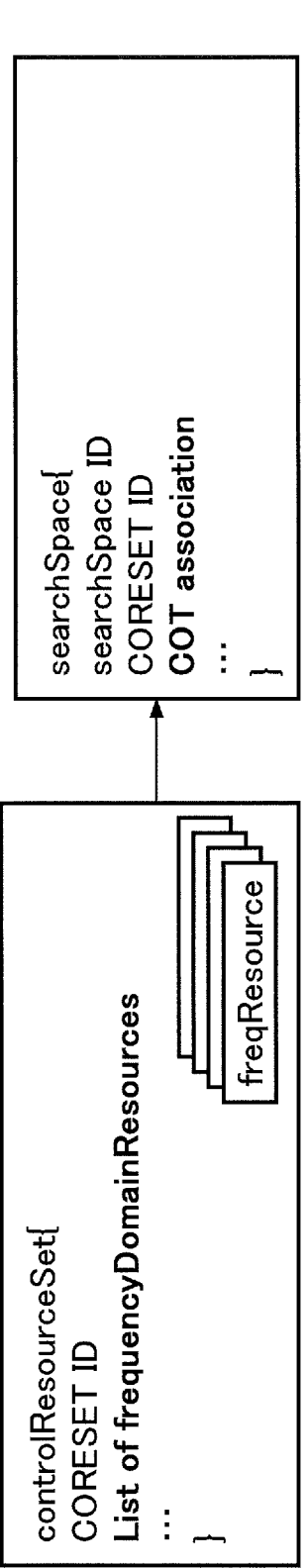
FIG. 14 is a diagram for explaining Example 3.

FIG. 14 shows an example of configuration information of the CORESET and configuration of the search space configured from the base station apparatus 10 to the user terminal 20 in the Example 3.

The CORESET configuration information shown in FIG. 14 includes a list of parameters indicating frequency domain resources, which is a new information not found in existing technologies. The individual frequency domain resources that make up the list are frequency domain resources of a sub-CORESET.

The configuration information of the search space shown in FIG. 14 differs from that disclosed in Non-Patent Document 1 in that COT association is added.

As shown in FIG. 14, one CORESET containing multiple sub-CORESETs is associated with one search space ID.

The operation example of the user terminal 20 of the Example 3 is basically the same as the operation example described in FIG. 8.

However, in the Example 3, for example, one search space #W is configured to the user terminal 20 as a search space for outside of a COT, and one CORESET, for example, of the CORESET ID #X, is mapped to the search space W. For example, the CORESET is configured with five frequency domain resources (i.e., five sub-CORESETs) corresponding to LBT bands indicated by 1-5 in FIG. 8. Here, for convenience, five frequency domain resources corresponding to LBT bands 1-5 are referred to as frequency domain resources 1-5.

For example, the user terminal 20 monitors a frequency and time region designated by the CORESET of the CORESET IDX and the frequency domain resources 1 to 5 therein at the time position (period, offset) specified by the search space W.

The search space #Y is configured to the user terminal 20 as a search space for inside of a COT, and one CORESET of the CORESET ID #X is mapped to the search space Y.

For example, the user terminal 20 monitors a frequency and time region of a resource, of the frequency domain resources 1 to 5, corresponding to an LBT band in which LBT succeeds in the base station apparatus 10 at the time position (the period and the offset) designated by the search space #Y.

In the example of FIG. 8, in the Example 3, in the monitoring opportunities represented by A, B, G, and H, since the user terminal 20 understands that the corresponding slot is outside of a COT, the user terminal 20 monitors a PDCCH at the search space W. When the user terminal 20 detects that a slot is inside the COT and LBT bands in which LBT succeeds are 1-4, the user terminal 20 activates the search space #Y to monitor LBT bands of 1-4 at the monitoring opportunities indicated by C, D, E, and F. Also in Example 3, the configuring number of search spaces can be reduced compared to Example 1-1.

In accordance with any of the above-described Examples 1 to 3, wideband operation can be performed appropriately without unnecessarily increasing the complexity of the user terminal 20.

Example 4

Next, Example 4 applicable to all of Examples 1 to 3 will be described. In the Example 4, the user terminal 20 determines the type of wideband operation (wideband operation case_1 or wideband operation case_2) in the base station apparatus 10 by an explicit indication of the base station apparatus 10 or by an implicit indication based on other configuration information or the like.

The type of wideband operation is notified from the base station apparatus 10 to the user terminal 20 as an explicit indication, for example, by an RRC message, a MAC signal, or a DCI.

Implicit indications include, for example, options 1 to 3.
<Option 1>
When a search space associated with a CORESET limited to an LBT band (of a bandwidth smaller than a bandwidth of BWP) is configured in the user terminal 20, the user terminal 20 determines that the base station apparatus 10 operates the wideband operation case_2 for the user terminal 20. In other cases (that is, when all CORESETs configured in the user terminal 20 have a bandwidth that spans a plurality of LBT bands), the user terminal 20 determines that the base station apparatus 10 performs operation of the wideband operation case_1 for the user terminal 20.
<Option 2>
When the user terminal 20 is configured with a search space associated with a CORESET group, a search space associated with a CORESET having a plurality of sub-CORESETs, or a search space associated with a plurality of CORESETs, the user terminal 20 determines that the base station apparatus 10 performs operation of the wideband operation case_2 for the user terminal 20. Otherwise, the user terminal 20 determines that the base station apparatus 10 performs operation of the wideband operation case_1 for the user terminal 20.
<Option 3>
When the user terminal 20 is configured to monitor a DCI format 2_0 including indication of a channel occupancy frequency domain structure for which the size is not 0 (when the user terminal 20 receives the configuration information from the base station apparatus 10), the user terminal 20 determines that the base station apparatus 10 performs operation of the wideband operation case_2 for the user terminal 20. Otherwise, the user terminal 20 determines that the base station apparatus 10 performs operation of the wideband operation case_1 for the user terminal 20.

Indication of a channel occupancy frequency domain structure is, for example, to transmit a DCI format 2_0, including information of LBT subband in which LBT succeeds, as previously described.

According to the Example 4, since the user terminal 20 can appropriately determine the type of the wideband operation executed by the base station apparatus 10, the monitor operation can be performed appropriately according to the type of the wideband operation.

Example 5

Next, Example 5, which is applicable to all of Examples 1 to 4, will be described. Example 5 is a detailed description of configuration of a CORESET and includes Examples 5-1 and 5-2 below.

Example 5-1

In Example 5-1, the user terminal 20 does not assume that for a BWP, a CORESET restricted to within 1 LBT band (i.e., a CORESET with a bandwidth less than or equal to 1 LBT bandwidth) and a CORSET spanning multiple LBT bands (e.g., a CORESET with a BWP bandwidth) are configured at the same time. That is, in Example 5-1, the user terminal 20 assumes that when a CORESET is configured, one of the CORESET limited within 1 LBT bandwidth and a CORESET spanning multiple LBT bands is configured.

In this case, for example, when executing the wide band operation case_1, the base station apparatus 20 sets the CORESET over multiple LBT bands, and when executing the wide band operation case_2, sets one or more CORESET limited within one LBT bandwidth.

Example 5-2

In the Example 5-2, the user terminal 20 is simultaneously configured with a CORESET restricted to within 1 LBT band and a CORESET spanning multiple LBT bands for a BWP. Example 5-2 consists of Example 5-2-1 and Example 5-2-2, and each of them will be described.

Example 5-2-1

In Example 5-2-1, the CORESET limited to within 1 LBT band is associated with a search space outside a COT, and the CORESET spanning the multiple LBT bands is associated with a search space inside a COT.

The user terminal 20 dynamically determines frequency domain resources to be monitored, for example, based on a channel occupancy frequency domain structure indication by a GC-PDCCH.

An operation example according to Example 5-2-1 will be described with reference to FIG. 15. As in the example of FIG. 8, the example of FIG. 15 also consists of five LBT bands (e.g., 20 MHz width) 1-5 for an active BWP bandwidth (e.g., 100 MHz).

Figure 15:
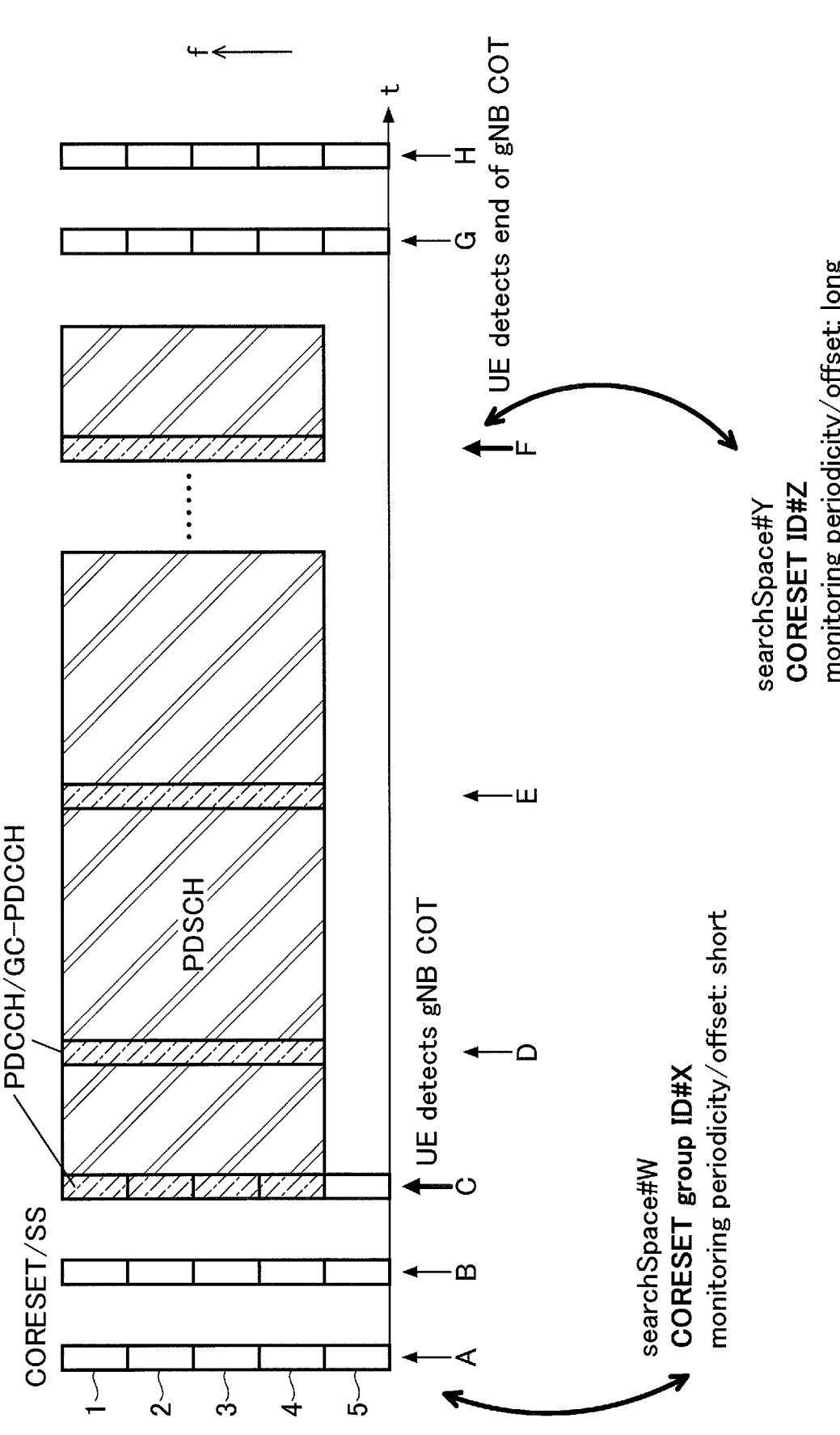
FIG. 15 is a diagram for explaining Example 5-2-1.

In the example of FIG. 15, for example, the search space #W is configured to the user terminal 20 as a search space (a search space with a short monitoring period) for outside of a COT. Further, for the search space #W, for example, a CORESET group (ID #X) consisting of five CORESETs of CORESET IDs #X1, #X2, #X3, #X4, and #X5 described in the Example 1-1 is associated. For example, the user terminal 20 monitors a frequency and time region designated by the CORESETs of CORESET IDs #X1 to X5 at the time position (period, offset) designated by the search space #W outside the COT.

For example, a search space #Y, a search space #K, and a search space #1, are configured to the user terminal 20 as search spaces for inside of the COT. For example, a CORESET (ID #Z) specifying frequency domain resources of bands spanning the LBT bands 1 to 4 is associated with the search space #Y, a CORESET (ID #M) specifying frequency domain resources of bands spanning LBT bands 1 to 5 is associated with the search space #K, and a CORESET (ID

N) specifying frequency domain resources of bands spanning LBT bands 2 to 5 is associated with the search space #L.

The user terminal 20 activates a search space associated with a CORESET corresponding to an LBT band in which LBT succeeds in the base station apparatus 10 to monitor a PDCCH. For example, in the example of FIG. 15, since LBT is successful in the LBT bands 1 to 4, the user terminal 20 monitors frequency and time region specified by the CORE-SET (ID #Z) at the time position (period, offset) specified by the search space #Y to which the CORESET (ID #Z) specifying the frequency domain resources of the band spanning the LBT bands 1 to 4 is associated.

Example 5-2-2

In Example 5-2-2, a CORESET limited to within 1 LBT band may be associated with both a search space outside a COT and a search space within a COT. Also, a CORESET spanning multiple LBT bands may be associated with both a search space outside a COT and a search space within a COT.

The user terminal 20 determines that a PDCCH is transmitted in a CORESET of band spanning a plurality of LBT bands only when LBT succeeds in the band spanning the plurality of LBT bands in the base station apparatus 10, for example.

For example, when the user terminal 20 detects that the wideband operation case_1 is executed in the base station apparatus 10 by an explicit or implicit indication, the user terminal 20 monitors a search space associated with a CORESET of the band spanning all LBT bands.

For example, when the user terminal 20 detects that the wideband operation case_2 is executed in the base station apparatus 10 by an explicit or implicit indication, the user terminal 20 performs monitoring of outside of COT in the search space associated with one or more CORESETs limited to within one LBT band, and when the user terminal 20 detects that LBT succeeds in the band spanning multiple LBT bands based on a channel occupancy frequency domain structure indication, the user terminal 20 performs monitoring of inside of the COT in the search space associated with a CORESET specifying the band.

According to Example 5, CORESETs and search spaces can be configured flexibly.

Example 6

Next, Example 6 will be described. Example 6 is a variation or complement applicable to all of Examples 1-5.

The user terminal 20 may report to the base station apparatus 10 as UE capability that the user terminal 20 supports the wideband operation case_2. The maximum number of CORESETs per BWP (or the maximum number of CORESETs per CORESET group or the maximum number of sub-CORESETs per CORESET) supported by the user terminal 20 may depend on whether the user terminal 20 supports wideband operation case_2.

For example, if the user terminal 20 notifies the base station apparatus 10 that it supports the wideband operation case_2, the base station apparatus 10 may assume the maximum number of CORESETs per BWP is 5, otherwise, the base station apparatus 10 may assume it is 3.

Activation/deactivation of a search space may also be based on explicit indication (e.g., search Space ID, COT association ID) by GC-PDCCH or PDCCH (or, GC-PDCCH and PDCCH).

The user terminal 20 may also perform PDCCH blind detection on all CORESETs associated with the active search space. The user terminal 20 may also detect one PDCCH and one GC-PDCCH with different CORSETs at the same OFDM symbol timing.

(Equipment Configuration)

Next, a functional configuration example of the base station apparatus 10 and the user terminal 20 that perform the processing and operations described above will be described. The base station apparatus 10 and the user terminal 20 include functions for implementing the above-described Example 1 to Example 6. However, each of the base station apparatus 10 and the user terminal 20 may include only some of the functions of Example 1 to Example 6.

<Base Station Apparatus 10>

Figure 16:
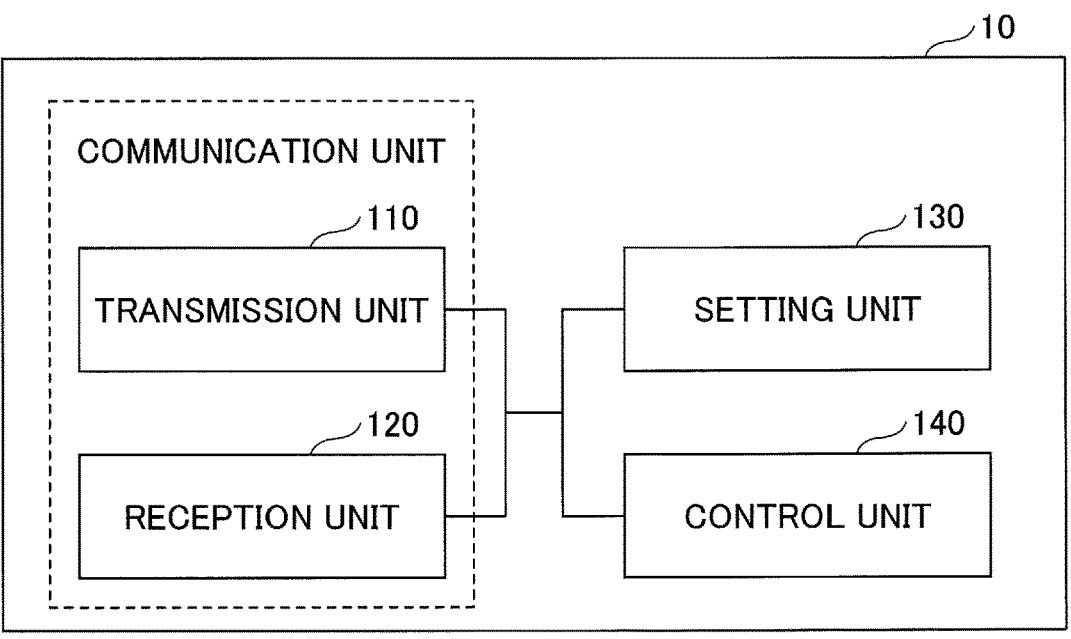
FIG. 16 shows an example of a functional configuration of a base station apparatus 10 according to an embodiment of the present invention.

FIG. 16 is a diagram illustrating an example of a functional configuration of the base station apparatus 10. As shown in FIG. 16, the base station apparatus 10 includes a transmission unit 110, a reception unit 120, a setting unit 130, and a control unit 140. The functional configuration shown in FIG. 16 is only one example. As long as the operation according to the embodiments of the present invention can be performed, the functional classification and the name of the functional unit may be any one. The transmission unit 110 and the reception unit 120 may be collectively referred to as a communication unit.

The transmission unit 110 includes a function for generating a signal to be transmitted to the user terminal 20 side and transmitting the signal wirelessly. The receiving unit 120 includes a function for receiving various signals transmitted from the user terminal 20 and acquiring, for example, information of a higher layer from the received signals. The transmission unit 110 has a function to transmit NR-PSS, NR-SSS, NR-PBCH, and DL/UL control signals, DCI by PDCCH, data by PDSCH, and the like to the user terminal 20.

The setting unit 130 stores preconfigured configuration information and various configuration information to be transmitted to the user terminal 20 in the storage device provided by the setting unit 130 and reads the preconfigured configuration information from the storage device as necessary.

The control unit 140 schedules DL reception or UL transmission of the user terminal 20 through the transmission unit 110. A function unit related to signal transmission in the control unit 140 may be included in the transmission unit 110, and a function unit related to signal reception in the control unit 140 may be included in the receiving unit 120. The transmission unit 110 may be called a transmitter, and the reception unit 120 may be called a receiver.

<User Terminal 20>

Figure 17:
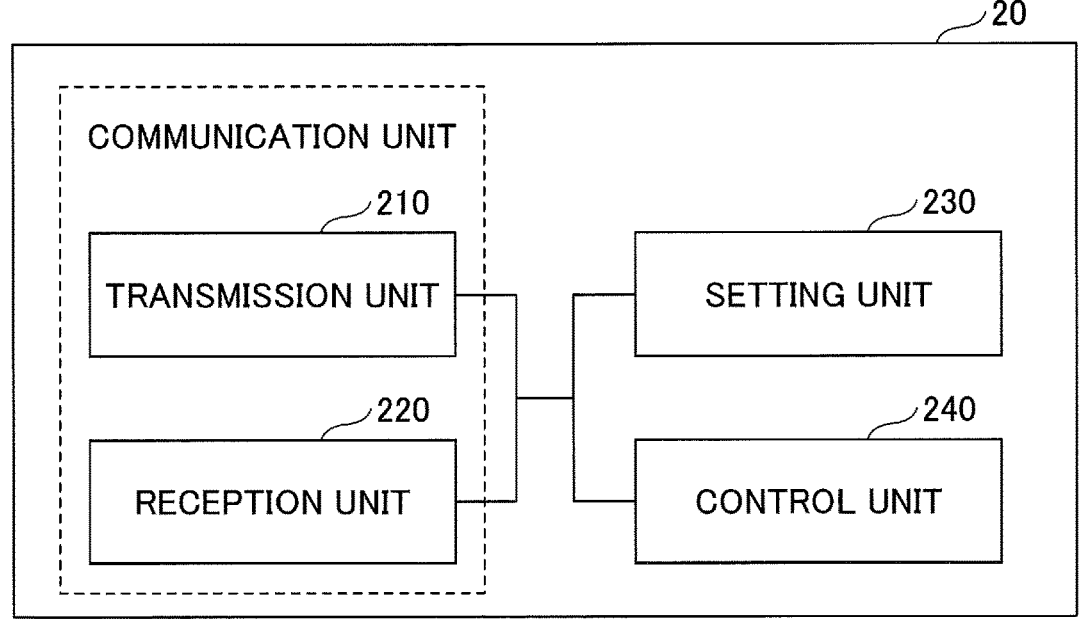
FIG. 17 is a diagram showing an example of a functional configuration of a user terminal 20 according to an embodiment of the present invention.

FIG. 17 is a diagram illustrating an example of the functional configuration of the user terminal 20. As shown in FIG. 17, the user terminal 20 includes a transmission unit 210, a reception unit 220, a setting unit 230, and a control unit 240. The functional configuration shown in FIG. 17 is only one example. As long as the operation according to the embodiments of the present invention can be performed, the functional classification and the name of the functional unit may be any one. The transmission unit 210 and the reception unit 220 may be collectively referred to as a communication unit. The user terminal 20 may be referred to as a terminal.

The transmission unit 210 creates a transmission signal from the transmission data and wirelessly transmits the transmission signal. The receiving unit 220 receives various signals wirelessly and acquires signals from higher layers from the received signal of the physical layer. The receiving unit 220 has a function to receive the NR-PSS, NR-SSS, NR-PBCH, and DL/UL/SL control signals transmitted from the base station apparatus 10, the DCI by the PDCCH, data by the PDSCH, and the like. For example, the transmitting unit 210 may transmit PSCCH (Physical Sidelink Control Channel), PSSCH (Physical Sidelink Shared Channel), PSDCH (Physical Sidelink Discovery Channel), PSBCH (Physical Sidelink Broadcast Channel), etc. to another user terminal 20 as D2D communication, and the receiving unit 120 may receive PSCCH, PSSCCH, PSDCH, PSDCH, or PSBCH, etc. from another user terminal 20.

The setting unit 230 stores various setting information received from the base station apparatus 10 or the user terminal 20 by the receiving unit 220 in the storage device provided by the setting unit 230 and reads it from the storage device as necessary. The setting unit 230 also stores the preset setting information.

The control unit 240 performs control of the user terminal 20. A function unit related to signal transmission in the control unit 240 may be included in the transmission unit 210, and a function unit related to signal reception in the control unit 240 may be included in the receiving unit 220. The transmission unit 210 may be referred to as a transmitter, and the reception unit 220 may be referred to as a receiver.

SUMMARY

In accordance with the present embodiment, at least a terminal shown in the following items 1 to 6 is provided.

(Item 1)

A terminal including:

a reception unit 220 configured to receive, from a base station apparatus, configuration information of a plurality of search spaces each of which is associated with a control resource set, wherein, between a plurality of control resource sets associated with the plurality of search spaces, values of parameters of a part of a plurality of parameters that each control resource set has are common, and the reception unit monitors a downlink physical control channel using a frequency domain resource designated by all of or a part of the plurality of control resource sets.

(Item 2)

A terminal including:

a reception unit 220 configured to receive, from a base station apparatus, configuration information of a search space that is associated with a plurality of control resource sets, wherein, between the plurality of control resource sets, values of parameters of a part of a plurality of parameters that each control resource set has are common, and the reception unit monitors a downlink physical control channel using a frequency domain resource designated by all of or a part of the plurality of control resource sets.

(Item 3)

A terminal including:

a reception unit 220 configured to receive, from a base station apparatus, configuration information of a search space that is associated with a control resource set group including a plurality of control resource sets, wherein, between the plurality of control resource sets, values of parameters of a part of a plurality of parameters that each control resource set has are common, and the reception unit monitors a downlink physical control channel using a frequency domain resource designated by all of or a part of the plurality of control resource sets.

(Item 4)

A terminal including:

a reception unit 220 configured to receive, from a base station apparatus, configuration information of a search space that is associated with a control resource set including a plurality of sub-control resource sets, wherein, between the plurality of sub-control resource sets, values of parameters of a part of a plurality of parameters for each sub-control resource set are common, and the reception unit monitors a downlink physical control channel using a frequency domain resource designated by all of or a part of the plurality of sub-control resource sets.

(Item 5)

The terminal as described in any one of items 1-4, wherein the reception unit changes a search space to use according to whether a timing to monitor is inside or outside a channel occupancy time obtained by LBT performed by the base station apparatus.

(Item 6)

The terminal as described in any one of items 1-5, wherein the reception unit determines a frequency domain resource for monitoring the downlink physical control channel based on subband in which LBT by the base station apparatus succeeded.

According to any of the configurations described in items, there is provided a technique that enables the user terminal to properly monitor a downlink physical control channel in wideband operation.

<Hardware Configuration>

The block diagrams (FIGS. 16 and 17) used for explaining the above embodiment illustrate blocks in units of functions. These functional blocks (constituting units) are implemented by any combinations of at least one of hardware and software. In this regard, a method for implementing the various functional blocks is not particularly limited. That is, each functional block may be implemented by one device united physically and logically. Alternatively, each functional block may be implemented by connecting directly or indirectly (for example, in a wired or wireless manner) two or more devices that are physically or logically separated and connected together and using these multiple devices. The functional block may be implemented by combining software with the single device or multiple devices.

Functions include, but are not limited to, determining, calculating, processing, deriving, investigating, searching, confirming, receiving, transmitting, outputting, accessing, resolving, selecting, establishing, comparing, assuming, expecting, considering, broadcasting, notifying, communicating, forwarding, configuring, reconfiguring, allocating, mapping, assigning, and the like. For example, a functional block (constituting unit) that has a function of transmitting is referred to as a transmitting unit or a transmitter. As described above, a method for implementing these functions is not particularly limited.

Figure 18:
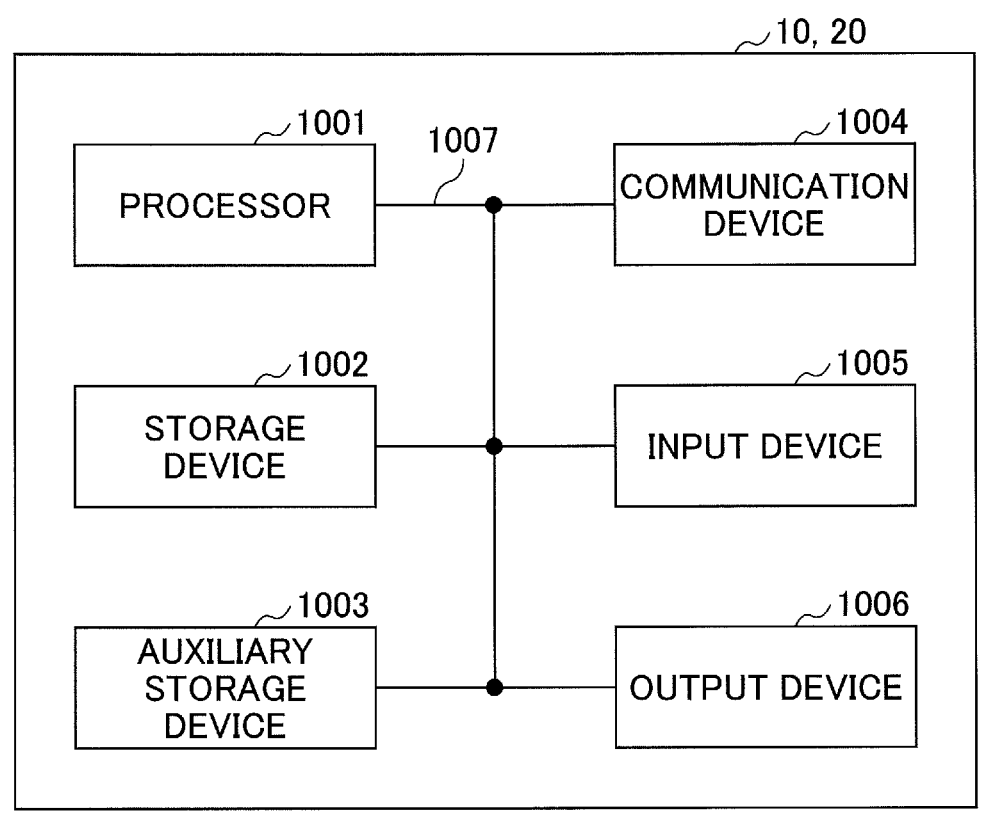
FIG. 18 is a diagram illustrating an example of the hardware configuration of the base station apparatus 10 or the user terminal 20 according to an embodiment of the present invention.

For example, the base station apparatus 10, the user terminal 20, and the like according to one embodiment of the present disclosure may function as a computer that performs processing of a wireless communication according to the present disclosure. FIG. 18 is a drawing illustrating an example of a hardware configuration of the base station apparatus 10 or the user terminal 20 according to an embodiment of the present disclosure. Each of the base station apparatus 10 and user terminal 20 may be physically configured as a computer device including a processor 1001, a storage device 1002, an auxiliary storage device 1003, a communication device 1004, an input device 1005, an output device 1006, a bus 1007, and the like.

It is noted that, in the following description, the term "device" may be read as a circuit, an apparatus, a unit, or the like. The hardware configurations of the base station apparatus 10 and the user terminal 20 may be configured to include one or more of the devices illustrated in drawings, or may be configured not to include some of the devices.

Each function of the base station apparatus 10 and the user terminal 20 may be implemented by reading predetermined software (program) to hardware such as the processor 1001, the storage device 1002, or the like, causing the processor 1001 to perform operations, controlling communication by the communication device 1004, and controlling at least one of reading and writing of data in the storage device 1002 and the auxiliary storage device 1003.

The processor 1001 executes, for example, an operating system to control the overall operation of the computer. The processor 1001 may be a central processing unit (CPU) including an interface with peripheral devices, a control device, an arithmetic device, a register, and the like. For example, the control unit 140, the control unit 240, and the like described above may be realized by the processor 1001.

The processor 1001 reads a program (program code), a software module, or data from at least one of the auxiliary storage device 1003 and the communication device 1004 onto the storage device 1002, and performs various processes according to the program, the software module, or the data. As the program, a program that causes a computer to perform at least some of the operations described in the embodiment explained above is used. For example, the control unit 140 of the base station apparatus 10, as illustrated in FIG. 16, may be implemented by a control program that is stored in the storage device 1002 and that is executed by the processor 1001. Also, for example, the control unit 240 of the user terminal 20, as illustrated in FIG. 17, may be implemented by a control program that is stored in the storage device 1002 and that is executed by the processor 1001. Explanation has been provided above for the case in which the above various processing are performed by the single processor 1001. However, such processing may be simultaneously or sequentially performed by two or more processors 1001. The processor 1001 may be implemented with one or more chips. It is noted that the program may be transmitted from a network through an electronic communication line.

The storage device 1002 is a computer-readable recording medium and may be constituted by at least one of, for example, a ROM (Read Only Memory), an EPROM (Erasable Programmable ROM), an EEPROM (Electrically Erasable Programmable ROM), a RAM (Random Access Memory), and the like. The storage device 1002 may also be referred to as a register, a cache, a main memory (main storage device), or the like. The storage device 1002 can store a program (program code), a software module and the like that can be executed to perform a communication method according to an embodiment of the present disclosure.

The auxiliary storage device 1003 is a computer-readable recording medium and may be configured by at least one of, for example, an optical disk such as a CD-ROM (Compact Disc ROM), a hard disk drive, a flexible disk, a magneto-optical disk (for example, a compact disk, a digital versatile disk, or a Blu-ray (registered trademark) disk), a smart card, a flash memory (for example, a card, a stick, or a key drive), a floppy (registered trademark) disk, a magnetic strip, and the like. The auxiliary storage device 1003 may be referred to as an auxiliary storage device. The above storage medium may be, for example, a database, a server, or other appropriate media including at least one of the storage device 1002 and the auxiliary storage device 1003.

The communication device 1004 is hardware (a transmission and reception device) for performing communication between computers through at least one of a wired and wireless networks and may also be referred to as, for example, a network device, a network controller, a network card, a communication module, or the like. The communication device 1004 may include, for example, a radio frequency switch, a duplexer, a filter, a frequency synthesizer, or the like to implement at least one of a frequency division duplex (FDD) and a time division duplex (TDD). For example, a transmission and reception antenna, an amplifier, a transmitting and receiving unit, a transmission line interface, and the like may be implemented by the communication device 1004. The transmitting and receiving unit may be implemented in such a manner that a transmitting unit and a receiving unit are physically or logically separated.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs an output to the outside. It is noted that the input device 1005 and the output device 1006 may be integrated with each other (for example, a touch panel).

The devices, such as the processor 1001 and the storage device 1002, are connected to each other via a bus 1007 for communicating information. The bus 1007 may be constituted by using a single bus, or may be constituted by using busses different depending on devices.

The base station apparatus 10 and the user terminal 20 may include hardware, such as a microprocessor, a digital signal processor (DSP), an ASIC (Application Specific Integrated Circuit), a PLD (Programmable Logic Device), or an FPGA (Field Programmable Gate Array), or alternatively, some or all of the functional blocks may be implemented by the hardware. For example, the processor 1001 may be implemented with at least one of these hardware components.

Supplements to Embodiment

The embodiment of the present invention has been described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for explanation, but the numerical values are merely examples, and any suitable values may be used unless otherwise stated. Classifications of items in the above description are not essential to the present invention, contents described in two or more items may be used in combination if necessary, and contents described in an item may be applied to contents described in another item (unless a contradiction arises). The boundaries between the functional units or the processing units in the functional block diagrams do not necessarily correspond to the boundaries of physical components. Operations of a plurality of functional units may be physically implemented by a single component and an operation of a single functional unit may be physically implemented by a plurality of components. Concerning the processing procedures described above in the embodiment, the orders of steps may be changed unless a contradiction arises. For the sake of convenience for describing the processing, the base station apparatus 10 and the user terminal 20 have been described with the use of the functional block diagrams, but these apparatuses may be implemented by hardware, software, or a combination thereof. Each of software functioning with a processor of the base station apparatus 10 according to the embodiment of the present invention and software functioning with a processor of the user terminal 20 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any suitable recording media.

Also, the notification of information is not limited to the aspect or embodiment described in the present disclosure, but may be performed by other methods. For example, the notification of information may be performed by physical layer signaling (for example, DCI (Downlink Control Information), UCI (Uplink Control Information)), higher layer signaling (for example, RRC (Radio Resource Control) signaling, MAC (Medium Access Control) signaling, broadcast information (an MIB (Master Information Block) and an SIB (System Information Block)), other signals, or combinations thereof. The RRC signaling may be also be referred to as an RRC message and may be, for example, an RRC connection setup message, an RRC connection reconfiguration message, or the like.

Each aspect and embodiment described in the present disclosure may be applied to at least one of a system that uses a suitable system such as LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), or Bluetooth (registered trademark), and a next-generation system expanded on the basis thereof. Also a plurality of systems may be combined and applied (for example, a combination of at least one of LTE and LTE-A with 5G, and the like).

In the operation procedures, sequences, flowcharts, and the like according to each aspect and embodiment described in the present disclosure, the orders of steps may be changed unless a contradiction arises. For example, in the methods described in the present disclosure, elements of various steps are illustrated by using an exemplary order and the methods are not limited to the specific orders presented.

The specific operations performed by the base station apparatus 10 described in the present disclosure may in some cases be performed by an upper node. It is clear that, in a network that includes one or more network nodes including the base station apparatus 10, various operations performed for communication with the user terminal 20 can be performed by at least one of the base station apparatus 10 and another network node other than the base station apparatus 10 (for example, a MME, a S-GW, or the like may be mentioned, but not limited thereto). In the above, the description has been made for the case where another network node other than the base station apparatus 10 is a single node as an example. But the another network node may be a combination of a plurality of other network nodes (for example, a MME and a S-GW).

Information, signals, or the like described in the present disclosure may be output from a higher layer (or a lower layer) to a lower layer (or a higher layer). Information, signals, or the like described in the present disclosure may be input and output via a plurality of network nodes.

Information or the like that has been input or output may be stored at a predetermined place (for example, a memory) and may be managed with the use of a management table. Information or the like that is input or output can be overwritten, updated, or appended. Information or the like that has been output may be deleted. Information or the like that has been input may be transmitted to another apparatus.

In the present disclosure, determination may be made with the use of a value expressed by one bit (0 or 1), may be made with the use of a Boolean value (true or false), and may be made through a comparison of numerical values (for example, a comparison with a predetermined value).

Regardless of whether software is referred to as software, firmware, middleware, microcode, a hardware description language, or another name, software should be interpreted broadly to mean instructions, instruction sets, codes, code segments, program codes, a program, a sub-program, a software module, an application, a software application, a software package, a routine, a subroutine, an object, an executable file, an execution thread, a procedure, a function, and the like.

Software, instructions, information, or the like may be transmitted and received through transmission media. For example, in a case where software is transmitted from a website, a server or another remote source through at least one of wired technology (such as a coaxial cable, an optical-fiber cable, a twisted pair, or a digital subscriber line (DSL)) and radio technology (such as infrared or micro-waves), at least one of the wired technology and the radio technology is included in the definition of a transmission medium.

Information, signals, and the like described in the present disclosure may be expressed with the use of any one of various different technologies. For example, data, instructions, commands, information, signals, bits, symbols, chips, and the like mentioned herein throughout the above explanation may be expressed by voltages, currents, electromagnetic waves, magnetic fields or magnetic particles, optical fields or photons, or any combinations thereof.

The terms described in the present disclosure and the terms necessary for understanding the present disclosure may be replaced with terms having the same or similar meanings. For example, at least one of a channel and a symbol may be a signal (signaling). A signal may be a message. A component carrier (CC) may be referred to as a carrier frequency, a cell, a frequency carrier, or the like.

The terms "system" and "network" used in the present disclosure are used interchangeably.

Information, parameters, and the like described in the present disclosure may be expressed by absolute values, may be expressed by relative values with respect to predetermined values, and may be expressed by corresponding different information. For example, radio resources may be indicated by indexes.

The above-described names used for the parameters are not restrictive in any respect. In addition, formulas or the like using these parameters may be different from those explicitly disclosed in the present disclosure. Various channels (for example, a PUSCH, a PUCCH, a PDCCH, and the like) and information elements can be identified by any suitable names, and therefore, various names given to these various channels and information elements are not restrictive in any respect.

In the present disclosure, terms such as "base station (BS)", "radio base station", "base station apparatus", "fixed station", "NodeB", "eNodeB (eNB)", "gNodeB (gNB)", "access point", "transmission point", "reception point", "transmission/reception point", "cell", "sector", "cell group", "carrier", "component carrier", and the like may be used interchangeably. A base station may be referred to as a macro-cell, a small cell, a femtocell, a pico-cell, or the like.

A base station can accommodate one or a plurality of (for example, three) cells (that may be called sectors). In a case where a base station accommodates a plurality of cells, the whole coverage area of the base station can be divided into a plurality of smaller areas. For each smaller area, a base station subsystem (for example, an indoor miniature base station RRH (Remote Radio Head)) can provide a communication service. The term "cell" or "sector" denotes all or a part of the coverage area of at least one of a base station and a base station subsystem that provides communication services in the coverage.

In the present disclosure, terms such as "mobile station (MS)", "user terminal", "user equipment (UE)", and "terminal" may be used interchangeably.

By the person skilled in the art, a mobile station may be referred to as any one of a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, and other suitable terms.

At least one of a base station and a mobile station may be referred to as a transmitting apparatus, a receiving apparatus, a communication apparatus, or the like. At least one of a base station and a mobile station may be an apparatus mounted on a mobile body, or may be a mobile body itself, or the like. A mobile body may be a transporting device (e.g., a vehicle, an airplane, and the like), an unmanned mobile (e.g., a drone, an automated vehicle, and the like), or a robot (of a manned or unmanned type). It is noted that at least one of a base station and a mobile station includes an apparatus that does not necessarily move during a communication operation. For example, at least one of a base station and a mobile station may be an IoT (Internet of Thing) device such as a sensor.

In addition, a base station apparatus according to the present disclosure may be read as a user terminal. For example, each aspect or embodiment of the present disclosure may be applied to a configuration in which communication between a base station apparatus and a user terminal is replaced by communication between a plurality of user terminals 20 (that may be called D2D (Device-to-Device), V2X (Vehicle-to-Everything), or the like). In this case, a user terminal 20 may have above-described functions of the base station apparatus 10. In this regard, a word such as "up" or "down" may be read as a word corresponding to communication between terminals (for example, "side"). For example, an uplink channel, a downlink channel, or the like may be read as a side channel.

Similarly, a user terminal according to the present disclosure may be replaced with a base station apparatus. In this case, a base station apparatus may have above-described functions of the user terminal.

The term "determine" used herein may mean various operations. For example, judging, calculating, computing, processing, deriving, investigating, looking up, searching, inquiring (for example, looking up a table, a database, or another data structure), ascertaining, or the like may be deemed as making determination. Also, receiving (for example, receiving information), transmitting (for example, transmitting information), inputting, outputting, or accessing (for example, accessing data in a memory), or the like may be deemed as making determination. Also, resolving, selecting, choosing, establishing, comparing, or the like may be deemed as making determination. That is, doing a certain operation may be deemed as making determination. "To determine" may be read as "to assume", "to expect", "to consider", or the like.

Each of the terms "connected" and "coupled" and any variations thereof mean any connection or coupling among two or more elements directly or indirectly and can mean that one or a plurality of intermediate elements are inserted among two or more elements that are "connected" or "coupled" together. Coupling or connecting among elements may be physical one, may be logical one, and may be a combination thereof. For example, "connecting" may be read as "accessing". In a case where the terms "connected" and "coupled" and any variations thereof are used in the present disclosure, it may be considered that two elements are "connected" or "coupled" together with the use of at least one type of a medium from among one or a plurality of wires, cables, and printed conductive traces, and in addition, as some non-limiting and non-inclusive examples, it may be considered that two elements are "connected" or "coupled" together with the use of electromagnetic energy such as electromagnetic energy having a wavelength of the radio frequency range, the microwave range, or the light range (including both of the visible light range and the invisible light range).

A reference signal can be abbreviated as an RS (Reference Signal). A reference signal may be referred to as a pilot depending on an applied standard.

A term "based on" used in the present disclosure does not mean "based on only" unless otherwise specifically noted. In other words, a term "base on" means both "based on only" and "based on at least".

Any references to elements denoted by a name including terms such as "first" or "second" used in the present disclosure do not generally limit the amount or the order of these elements. These terms can be used in the present disclosure as a convenient method for distinguishing one or a plurality of elements. Therefore, references to first and second elements do not mean that only the two elements can be employed or that the first element should be, in some way, prior to the second element.

"Means" in each of the above apparatuses may be replaced with "unit", "circuit", "device", or the like.

In a case where any one of "include", "including", and variations thereof is used in the present disclosure, each of these terms is intended to be inclusive in the same way as the term "comprising". Further, the term "or" used in the present disclosure is intended to be not exclusive-or.

A radio frame may include, in terms of time domain, one or a plurality of frames. Each of one or a plurality of frames may be referred to as a subframe in terms of time domain. A subframe may include, in terms of time domain, one or a plurality of slots. A subframe may have a fixed time length (e.g., 1 ms) independent of Numerology.

Numerology may be a communication parameter that is applied to at least one of transmission and reception of a signal or a channel. Numerology may mean, for example, at least one of a subcarrier spacing (SCS), a bandwidth, a symbol length, a cyclic prefix length, a transmission time interval (TTI), the number of symbols per TTI, a radio frame configuration, a specific filtering processing performed by a transceiver in frequency domain, a specific windowing processing performed by a transceiver in time domain, and the like.

A slot may include, in terms of time domain, one or a plurality of symbols (OFDM (Orthogonal Frequency Division Multiplexing) symbols, SC-FDMA (Single Carrier Frequency Division Multiplexing) symbols) symbols, or the like). A slot may be a time unit based on Numerology.

A slot may include a plurality of minislots. Each minislot may include one or a plurality of symbols in terms of the time domain. A minislot may also be referred to as a subslot. A minislot may include fewer symbols than a slot. A PDSCH (or PUSCH) transmitted at a time unit greater than a minislot may be referred to as a PDSCH (or PUSCH) mapping type A. A PDSCH (or PUSCH) transmitted using minislots may be referred to as a PDSCH (or PUSCH) mapping type B.

Each of a radio frame, a subframe, a slot, a minislot, and a symbol means a time unit configured to transmit a signal. Each of a radio frame, a subframe, a slot, a minislot, and a symbol may be referred to as other names respectively corresponding thereto.

For example, one subframe may be referred to as a transmission time interval (TTI), a plurality of consecutive subframes may be referred to as a TTI, and one slot or one minislot may be referred to as a TTI. That is, at least one of a subframe and a TTI may be a subframe (1 ms) according to the existing LTE, may have a period shorter than 1 ms (e.g., 1 to 13 symbols), and may have a period longer than 1 ms. Instead of subframes, units expressing a TTI may be referred to as slots, minislots, or the like. Also, 1 slot may be referred to as unit time. The unit time may be different depending on numerology for each cell.

A TTI means, for example, a minimum time unit of scheduling in radio communication. For example, in an LTE system, a base station performs scheduling for each user terminal 20 to assign, in TTI units, radio resources (such as frequency bandwidths, transmission power, and the like that can be used by each user terminal 20). However, the definition of a TTI is not limited thereto.

A TTI may be a transmission time unit for channel-coded data packets (transport blocks), code blocks, code words, or the like, and may be a unit of processing such as scheduling, link adaptation, or the like. When a TTI is given, an actual time interval (e.g., the number of symbols) to which transport blocks, code blocks, code words, or the like are mapped may be shorter than the given TTI.

In a case where one slot or one minislot is referred to as a TTI, one or a plurality of TTIs (i.e., one or a plurality of slots or one or a plurality of minislots) may be a minimum time unit of scheduling. The number of slots (the number of minislots) included in the minimum time unit of scheduling may be controlled.

A TTI having a time length of 1 ms may referred to as an ordinary TTI (a TTI according to LTE Rel.8-12), a normal TTI, a long TTI, an ordinary subframe, a normal subframe, a long subframe, a slot, or the like. A TTI shorter than an ordinary TTI may be referred to as a shortened TTI, a short TTI, a partial or fractional TTI, a shortened subframe, a short subframe, a minislot, a subslot, a slot, or the like.

Note that a long TTI (for example, normal TTI, subframe, and the like) may be read as TTI having a time length exceeding 1 ms, and a short TTI (for example, shortened TTI) may be read as a TTI having a TTI length less than the TTI length of the long TTI and equal to or more than 1 ms.

A resource block (RB) is a resource assignment unit in terms of time domain and frequency domain and may include one or a plurality of consecutive subcarriers in terms of frequency domain. The number of subcarriers included in an RB may be the same regardless of Numerology, and, for example, may be 12. The number of subcarriers included in a RB may be determined based on Numerology.

In terms of time domain, an RB may include one or a plurality of symbols, and may have a length of 1 minislot, 1 subframe, or 1 TTI. Each of 1 TTI, 1 subframe, and the like may include one or a plurality of resource blocks.

One or a plurality of RBs may be referred to as physical resource blocks (PRBs: Physical RBs), a subcarrier group (SCG: Sub-Carrier Group), a resource element group (REG: Resource Element Group), a PRB pair, an RB pair, or the like.

A resource block may include one or a plurality of resource elements (RE: Resource Elements). For example, 1 RE may be a radio resource area of 1 subcarrier and 1 symbol.

A bandwidth part (BWP) (which may be called a partial bandwidth or the like) may mean a subset of consecutive common RBs (common resource blocks) for Numerology, in any given carrier. A common RB may be identified by a RB index with respect to a common reference point in the carrier. PRBs may be defined by a BWP and may be numbered in the BWP.

A BWP may include a BWP (UL BWP) for UL and a BWP (DL BWP) for DL. For a UE, one or a plurality of BWPs may be set in 1 carrier.

At least one of BWPs that have been set may be active, and a UE need not assume sending or receiving a predetermined signal or channel outside the active BWP. A "cell", a "carrier" or the like in the present disclosure may be read as a "BWP".

The above-described structures of radio frames, subframes, slots, minislots, symbols, and the like are merely examples. For example, the number of subframes included in a radio frame, the number of slots included in a subframe or a radio frame, the number of minislots included in a slot, the number of symbols and the number of RBs included in a slot or a minislot, the number of subcarriers included in an RB, the number of symbols included in a TTI, a symbol length, a cyclic prefix (CP) length, and the like can be variously changed.

Throughout the present disclosure, in a case where an article such as "a", "an", or "the" in English is added through a translation, the present disclosure may include a case where a noun following such article is of a plural forms.

Throughout the present disclosure, an expression that "A and B are different" may mean that "A and B are different from each other". Also this term may mean that "each of A and B is different from C". Terms such as "separate" and "coupled" may also be interpreted in a manner similar to "different".

Each aspect or embodiment described in the present disclosure may be solely used, may be used in combination with another embodiment, and may be used in a manner of being switched with another embodiment upon implementation. Notification of predetermined information (for example, notification of "being x") may be implemented not only explicitly but also implicitly (for example, by not notifying predetermined information).

In the present disclosure, the transmission unit 210 and the reception unit 220 are examples of communication units.

The transmission unit 110 and the reception unit 120 are examples of communication units. UECpability Enquiry is an example of a first RRC message that queries the capabilities of a user terminal. UECpability Information is an example of a second RRC message reporting UE capabilities.

Although the present disclosure has been described above, it will be understood by those skilled in the art that the present disclosure is not limited to the embodiment described in the present disclosure. Modifications and changes of the present disclosure may be possible without departing from the subject matter and the scope of the present disclosure defined by claims. Therefore, the descriptions of the present disclosure are for illustrative purposes only, and are not intended to be limiting the present disclosure in any way.

DESCRIPTION OF SYMBOLS

10 base station apparatus
110 transmitting unit
120 receiving unit
130 configuring unit
140 control unit
user terminal
210 transmitting unit
220 receiving unit
230 configuring unit
240 control unit
1001 processor
1002 storage device
1003 auxiliary storage device
1004 communication device
1005 input device
1006 output device
The invention claimed is:

1. A terminal comprising:
a reception unit configured to receive configuration information of a search space designating a plurality of frequency domain resources for monitoring a PDCCH;
a control unit configured to monitor a PDCCH within a time duration in the plurality of frequency domain resources, wherein the time duration is the same among the plurality of frequency domain resources; and
a transmission unit configured to transmit a maximum supported number of the plurality of frequency domain resources to a base station apparatus as capability information,
wherein the time duration is designated by configuration information of a control resource set associated with the search space, and
wherein the terminal receives information indicating a start of a Channel Occupancy Time (COT).

2. A base station comprising:
a transmission unit configured to transmit, to a terminal, configuration information of a search space designating a plurality of frequency domain resources for monitoring a PDCCH;
a control unit configured to control the transmission unit such that the transmission unit transmits a signal by a PDCCH within a time duration in the plurality of frequency domain resources, wherein the time duration is the same among the plurality of frequency domain resources; and
a reception unit configured to receive a maximum supported number of the plurality of frequency domain resources from the terminal as capability information, wherein the time duration is designated by configuration information of a control resource set associated with the search space, and wherein the base station transmits, to the terminal, information indicating a start of a Channel Occupancy Time (COT).

3. A system comprising:

a terminal comprising:

a reception unit configured to receive configuration information of a search space designating a plurality of frequency domain resources for monitoring a PDCCH;

a control unit configured to monitor a PDCCH within a time duration in the plurality of frequency domain resources, wherein the time duration is the same among the plurality of frequency domain resources; and a transmission unit configured to transmit a maximum supported number of the plurality of frequency domain resources to a base station apparatus as capability information, wherein the time duration is designated by configuration information of a control resource set associated with the search space, and wherein the terminal receives information indicating a start of a Channel Occupancy Time (COT), and a base station comprising a transmission unit configured to transmit the configuration information and a reception unit configured to receive the maximum number of the plurality of frequency domain resources from the terminal as the capability information.

4. A communication method executed by a terminal, the communication method comprising:

receiving configuration information of a search space designating a plurality of frequency domain resources for monitoring a PDCCH;

monitoring a PDCCH within a time duration in the plurality of frequency domain resources, wherein the time duration is the same among the plurality of frequency domain resources; and transmitting a maximum supported number of the plurality of frequency domain resources to a base station apparatus as capability information, wherein the time duration is designated by configuration information of a control resource set associated with the search space, and wherein the terminal receives information indicating a start of a Channel Occupancy Time (COT).

* * * * *